US012542031B2

(12) United States Patent
(10) Patent No.: US 12,542,031 B2

Walsh et al.
(45) Date of Patent: Feb. 3, 2026

(54) DIGIT-BASED ELECTRONIC GAMING SYSTEMS AND METHODS WITH EXPANDING SYMBOL POSITIONS

(71) Applicant: Aristocrat Technologies, Inc., Las Vegas, NV (US)

(72) Inventors: Kevin Walsh, Reno, NV (US); Daniel Marston, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 232 days.

(21) Appl. No.: 18/237,650

(22) Filed: Aug. 24, 2023

(65) Prior Publication Data

US 2025/0069479 A1 Feb. 27, 2025

(51) Int. Cl.
*G07F 17/32* (2006.01)

(52) U.S. Cl.
CPC ...... *G07F 17/3267* (2013.01); *G07F 17/3213* (2013.01)

(58) Field of Classification Search
CPC ... G07F 17/3213; G07F 17/3267; G07F 17/34
See application file for complete search history.

(56) References Cited

U.S. PATENT DOCUMENTS

| | | | | |
|---|---|---|---|---|
| 6,186,894 | B1 * | 2/2001 | Mayeroff | G07F 17/34 463/16 |
| 6,319,124 | B1 | 11/2001 | Baerlocher | |
| 6,358,147 | B1 | 3/2002 | Jaffe | |
| 8,795,059 | B2 * | 8/2014 | Aoki | G07F 17/3213 463/20 |
| 10,950,083 | B2 | 3/2021 | Medford | |
| 2006/0046833 | A1 | 3/2006 | Hatakeyama | |
| 2009/0117991 | A1 | 5/2009 | Yoshizawa | |
| 2010/0016059 | A1 | 1/2010 | Sims | |
| 2011/0006477 | A1 | 1/2011 | Miller | |
| 2012/0172107 | A1 * | 7/2012 | Acres | G07F 17/34 463/16 |
| 2018/0061174 | A1 * | 3/2018 | Boese | G07F 17/3244 |
| 2018/0130285 | A1 * | 5/2018 | Ang | G07F 17/3244 |
| 2020/0250922 | A1 * | 8/2020 | Medford | G07F 17/34 |
| 2020/0250923 | A1 * | 8/2020 | Ceniceroz | G09G 3/20 |
| 2021/0366230 | A1 * | 11/2021 | Tam | G07F 17/3244 |
| 2023/0011416 | A1 | 1/2023 | Marks | |
| 2024/0378941 | A1 * | 11/2024 | Dies | G07F 17/3267 |

* cited by examiner

*Primary Examiner* — Justin L Myhr
(74) *Attorney, Agent, or Firm* — Armstrong Teasdale LLP

(57) ABSTRACT

An electronic gaming device that includes a memory device and a processor is described. The electronic gaming device is configured to cause display of a first symbol position, a second symbol position, and a third symbol position for an electronic game wherein the electronic game includes a plurality of plays and determine that at least four symbols will be displayed in an outcome for a play of the plurality of plays. The electronic gaming device is also configured to, in response to determining that the at least four symbols will be displayed, cause display of a fourth symbol position that was not previously displayed for the plurality of plays, and cause display of a respective symbol for the play at the first symbol position, the second symbol position, the third symbol position, and the fourth symbol position.

20 Claims, 22 Drawing Sheets

FIG. 14
1200
$100,000.00
$UPER FRENZY HIT$
99
CREDITS
9
2
7
2
SPINS
REMAINING
PRESS PLAY TO BEGIN
WIN
CREDIT
23520
20
3
60

1300

1400

1500

DIGIT-BASED ELECTRONIC GAMING SYSTEMS AND METHODS WITH EXPANDING SYMBOL POSITIONS

TECHNICAL FIELD

The field of disclosure relates generally to electronic gaming, and more specifically, to digit-based electronic gaming systems and methods with expanding symbol positions.

BACKGROUND OF THE DISCLOSURE

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF SUMMARY OF THE DISCLOSURE DESCRIPTION

In one aspect, an electronic gaming device that includes at least one memory device with instructions stored thereon and at least one processor in communication with the at least one memory device is described. The instructions, when executed by the at least one processor, cause the at least one processor to cause display of a first symbol position, a second symbol position, and a third symbol position for an electronic game wherein the electronic game includes a plurality of plays and determine that at least four symbols will be displayed in an outcome for a play of the plurality of plays. The instructions also cause the at least one processor to, in response to determining that the at least four symbols will be displayed, cause display of a fourth symbol position that was not previously displayed for the plurality of plays, and cause display of a respective symbol for the play at the first symbol position, the second symbol position, the third symbol position, and the fourth symbol position.

In another aspect, at least one non-transitory computer-readable storage medium with instructions stored thereon is described. The instructions, in response to execution by at least one processor, cause the at least one processor to cause display of a first symbol position, a second symbol position, and a third symbol position for an electronic game wherein the electronic game includes a plurality of plays and determine that at least four symbols will be displayed in an outcome for a play of the plurality of plays. The instructions also cause the at least one processor to, in response to determining that the at least four symbols will be displayed, cause display of a fourth symbol position that was not previously displayed for the plurality of plays, and cause display of a respective symbol for the play at the first symbol position, the second symbol position, the third symbol position, and the fourth symbol position.

In another aspect, a method of electronic gaming implemented by at least one processor in communication with at least one memory is described. The method includes causing display of a first symbol position, a second symbol position, and a third symbol position for an electronic game wherein the electronic game includes a plurality of plays and determining that at least four symbols will be displayed in an outcome for a play of the plurality of plays. The method also includes, in response to determining that the at least four symbols will be displayed, causing display of a fourth symbol position that was not previously displayed for the plurality of plays, and causing display of a respective symbol for the play at the first symbol position, the second symbol position, the third symbol position, and the fourth symbol position.

DETAILED DESCRIPTION OF THE DISCLOSURE

Figure 1:
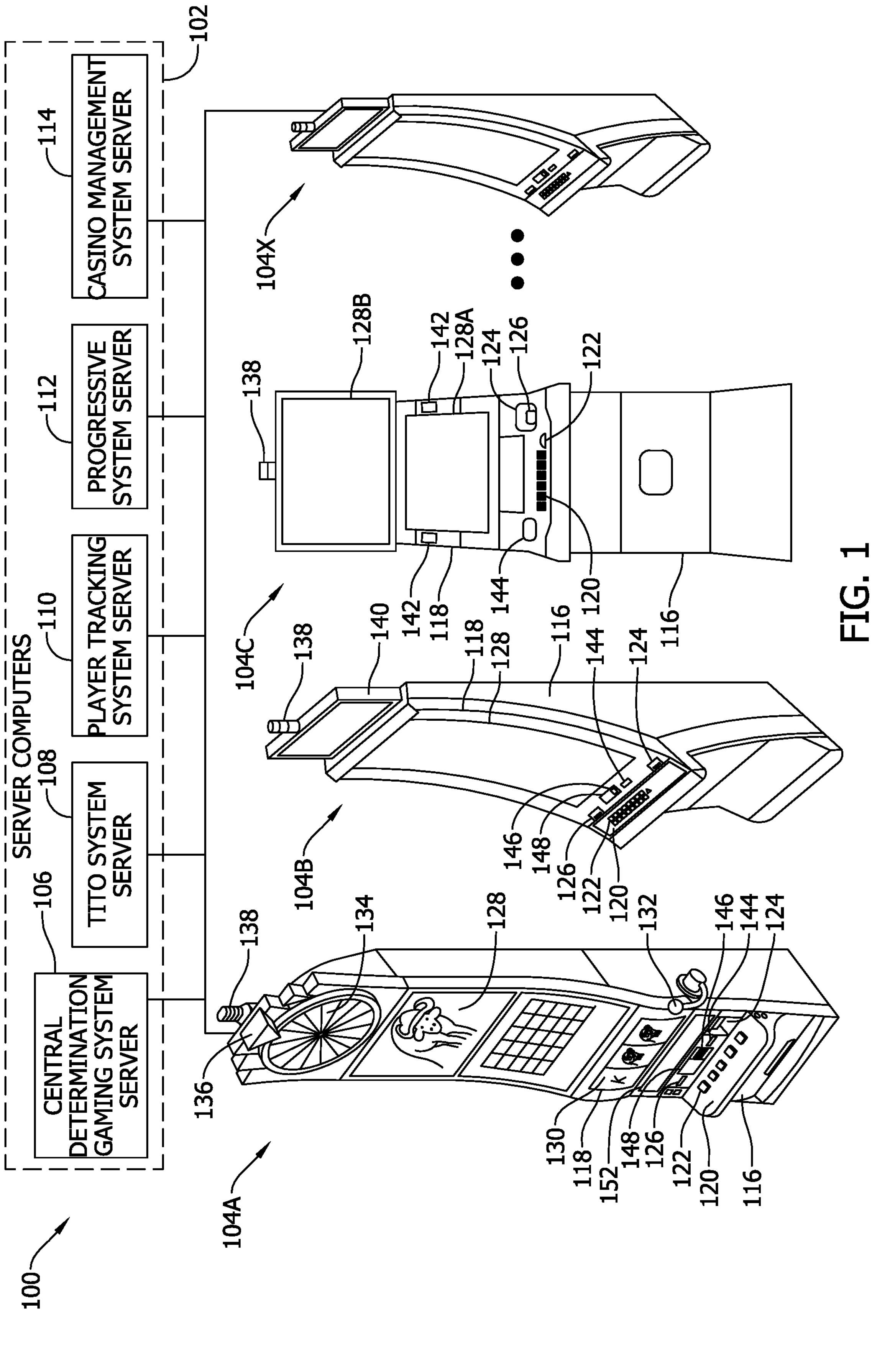
FIG. 1 is an exemplary diagram showing several EGMs networked with various gaming related servers.

This application is directed to digit-based electronic gaming systems and methods. In the example embodiment, an electronic game includes a reel feature including three to five individual reels with reel strips containing blanks, numerals (e.g., digits), and/or additional spin symbols (e.g., that cause an additional spin for the electronic game to be provided). An output for the electronic game may be the total value of contiguous digits (e.g., 09011 being displayed on the reels indicates an award of 9011 credits) or the output or the electronic game may be the sum of contiguous digits separated by blank symbols where contiguous digits on either side of the blank symbol(s) are concatenated and then summed (e.g., 09_11 being displayed on the reels indicates an award of 20 credits (e.g., 9+11), where _ is a blank symbol). In some embodiments, additional spin symbols may land on reel one (e.g., a leftmost reel) or reel five (e.g., a rightmost reel) in a five-reel set.

In the example embodiment, the electronic game described above is a bonus game that is triggered from a base game. For each spin and/or play of the bonus game, three initial reels are provided. The three reels may expand to include four or five reels. A predetermined number of spins may initially be provided for the bonus game. The number of spins may be increased during the bonus game when an additional spin symbol is displayed. In some embodiments, at least one extra reel (e.g., a fourth reel and/or a fifth reel) may need to be activated to land an additional spin symbol (e.g., a +1 symbol). The bonus game may also include a random respin feature where the reels are automatically respun, without deducting from the number of spins remaining, where with each automatic respin an output amount increases from a smaller output amount to a larger output amount.

The technical problems addressed herein include at least one of: (i) inability of known systems to award a value of contiguous digits where values separated by blanks are summed; (ii) inability of known systems to provide a contiguous digit award feature where one or more additional reels, which may land symbols awarding additional spins or prize digits, may be awarded during a spin; (iii) inability of known systems to provide a respin mechanic where some or all reels are respun after an initial result and the new resulting value is guaranteed to be larger than the initial result; (iv) inability of known systems to efficiently communicate complex information (e.g., in a screen of limited size) for an electronic game including selectively expanding reels; (v) inefficient use of computer resources in known gaming systems at least because of burdensome processing requirements when determining game outcomes; and (vi) lack of processing availability and speed in known gaming systems at least because of the burdensome processing requirements.

The resulting technical effect and/or technical benefits achieved herein include at least one of: (i) ability to award a value of contiguous digits where values separated by blanks are summed; (ii) ability to provide a contiguous digit award feature where one or more additional reels, which may land symbols awarding additional spins or prize digits, may be awarded during a spin; (iii) ability to provide a respin mechanic where some or all reels are respun after an initial result and the new resulting value is guaranteed to be larger than the initial result; (iv) ability to efficiently communicate complex information (e.g., in a screen of limited size) for an electronic game including selectively expanding reels in an improved interface; (v) efficient use of computer resources at least because of limited processing requirements when determining game outcomes; and (vi) enhanced processing availability and speed at least because of improved processing availability.

As indicated above, digit-based electronic gaming systems and methods are described herein. In other words, in the example embodiment, an electronic gaming system may cause display of a first symbol position, a second symbol position, and a third symbol position for an electronic game wherein the electronic game includes a plurality of plays. The electronic gaming system may then determine that at least four symbols will be displayed in an outcome for a play of the plurality of plays and, in response to determining that the at least four symbols will be displayed, cause display of a fourth symbol position that was not previously displayed for the plurality of plays. Further, the electronic gaming system may cause display of a respective symbol for the play at the first symbol position, the second symbol position, the third symbol position, and the fourth symbol position.

In some embodiments, the first symbol position, the second symbol position, the third symbol position, and the fourth symbol position are arranged in a side-by-side arrangement, and the electronic gaming system may determine that at least one of the respective symbols is a blank symbol. Further, the respective symbols not being the blank symbol may include respective numerical digits wherein multiple symbols of the respective symbols are included to the left of the blank symbol, and wherein the electronic gaming system may concatenate the respective numerical digits of the multiple symbols to generate a concatenated number, add the concatenated number to the respective numerical digit displayed to the right of the blank symbol to generate an output amount, and cause display of the output amount.

In some embodiments where at least one of the respective symbols is a blank symbol and wherein respective symbols not being the blank symbol include respective numerical digits and multiple symbols of the respective symbols are included to the right of the blank symbol, the electronic gaming system may concatenate the respective numerical digits of the multiple symbols to generate a concatenated number, add the concatenated number to the respective numerical digit displayed to the left of the blank symbol to generate an output amount, and cause display of the output amount.

In some embodiments where at least one of the respective symbols is a blank symbol and wherein respective symbols not being the blank symbol include respective numerical digits and multiple symbols of the respective symbols are included to the right and to the left of the blank symbol, the electronic gaming system may concatenate the respective numerical digits of the multiple symbols to the left of the blank symbol to generate a first concatenated number and concatenate the respective numerical digits of the multiple symbols to the right of the blank symbol to generate a second concatenated number. The electronic gaming system may then add the first concatenated number to the second concatenated number to generate an output amount and cause display of the output amount.

In some embodiments where at least one of the respective symbols is a blank symbol and wherein respective symbols not being the blank symbol include respective numerical digits and the blank symbol is at least one of a leftmost symbol of the respective symbols or a rightmost symbol of the respective symbols, the electronic gaming system may concatenate the respective numerical digits of the respective symbols not being the blank symbol to generate a concatenated number and cause display the concatenated number as an output amount.

In some embodiments, the electronic gaming system may determine that at least five symbols will be displayed in an outcome for a second play of the plurality of plays (e.g., and/or less than five symbols will be displayed but that a symbol will be provided at a symbol position that was not previously displayed for the plurality of plays) and, in response to determining that the at least five symbols will be displayed, cause display of a fifth symbol position that was not previously displayed for the plurality of plays. Further, the electronic gaming system may determine that at least three symbols will be displayed in an outcome for a prior play of the plurality of plays, the prior play occurring prior to the play of the plurality of plays and the second play of the plurality of plays, and cause display of a respective symbol for the prior play at the first symbol position, the second symbol position, and the third symbol position while not causing display of the fourth symbol position or the fifth symbol position.

In some embodiments, the electronic gaming system may cause display of a plurality of display areas for a base game different from the electronic game, randomly determine whether to add an unlock symbol to a display area of the plurality of display areas upon each non-winning outcome of the base game, and upon each display area of the plurality of display areas including the unlock symbol, cause the electronic game to be initiated wherein the electronic game is a bonus game and/or a feature game.

In some embodiments, digits and blank symbols may be part of an equation including operators operating on the digits (e.g., the blank symbol may represent a multiplication operator or an addition operator, digits may be associated with operators such as addition or multiplication regardless of whether or not a blank symbol is displayed, etc.). For example, in some embodiments, when digits are displayed with no blank symbols, an operator may be determined (e.g., randomly) and a location of the operator (e.g., to form an equation that produces an output to be provided) may be determined (e.g., randomly). Various animations may be provided that communicate which operator is provided and a location of the operator (e.g., in between which digits the operator is provided).

The description provided herein includes certain examples and exemplary use cases. It should be understood that these examples and use cases are included herein for illustrative purposes, and these examples and use cases should not be taken to limit the present disclosure. The systems and methods described herein may be used in many other use cases.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
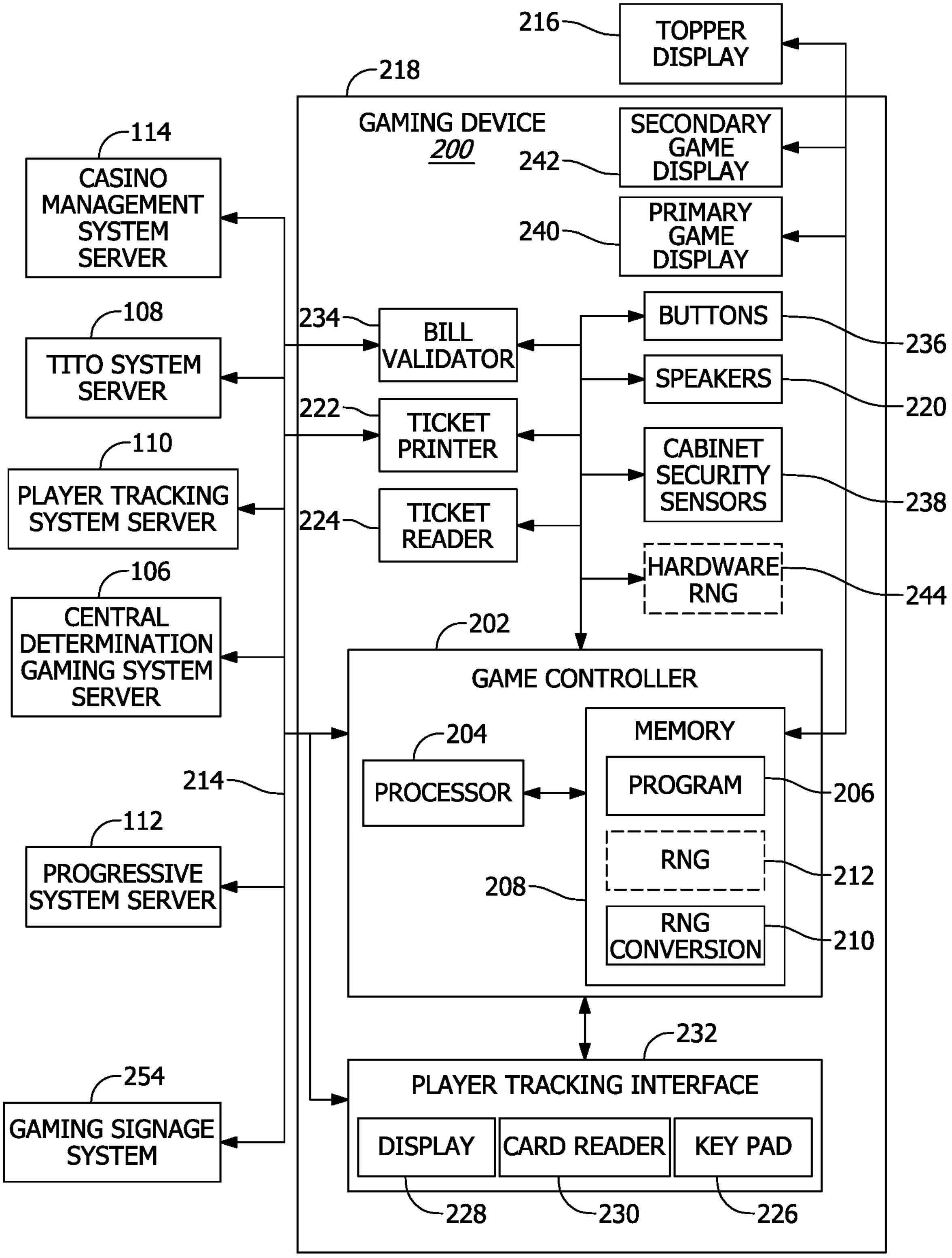
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
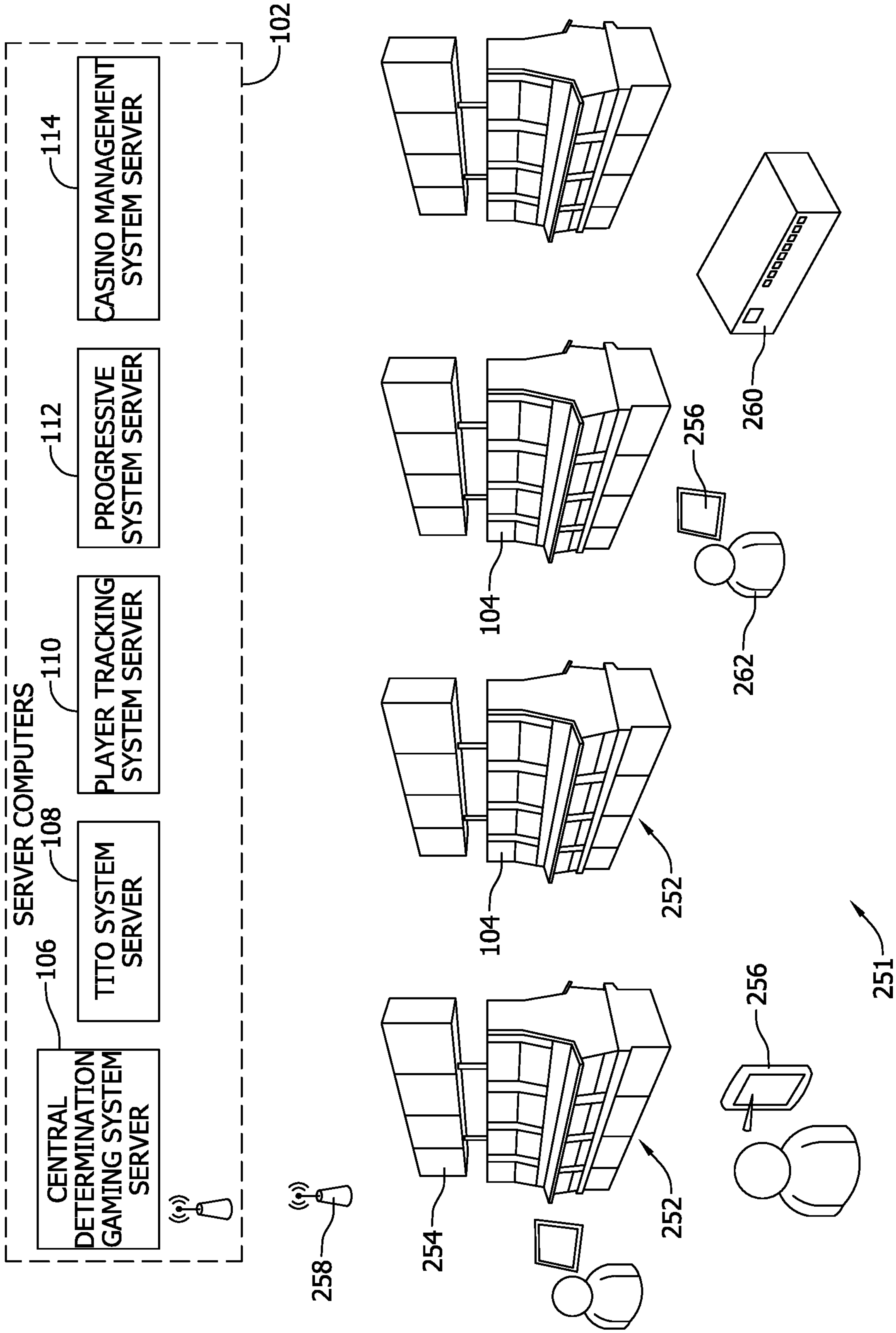
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
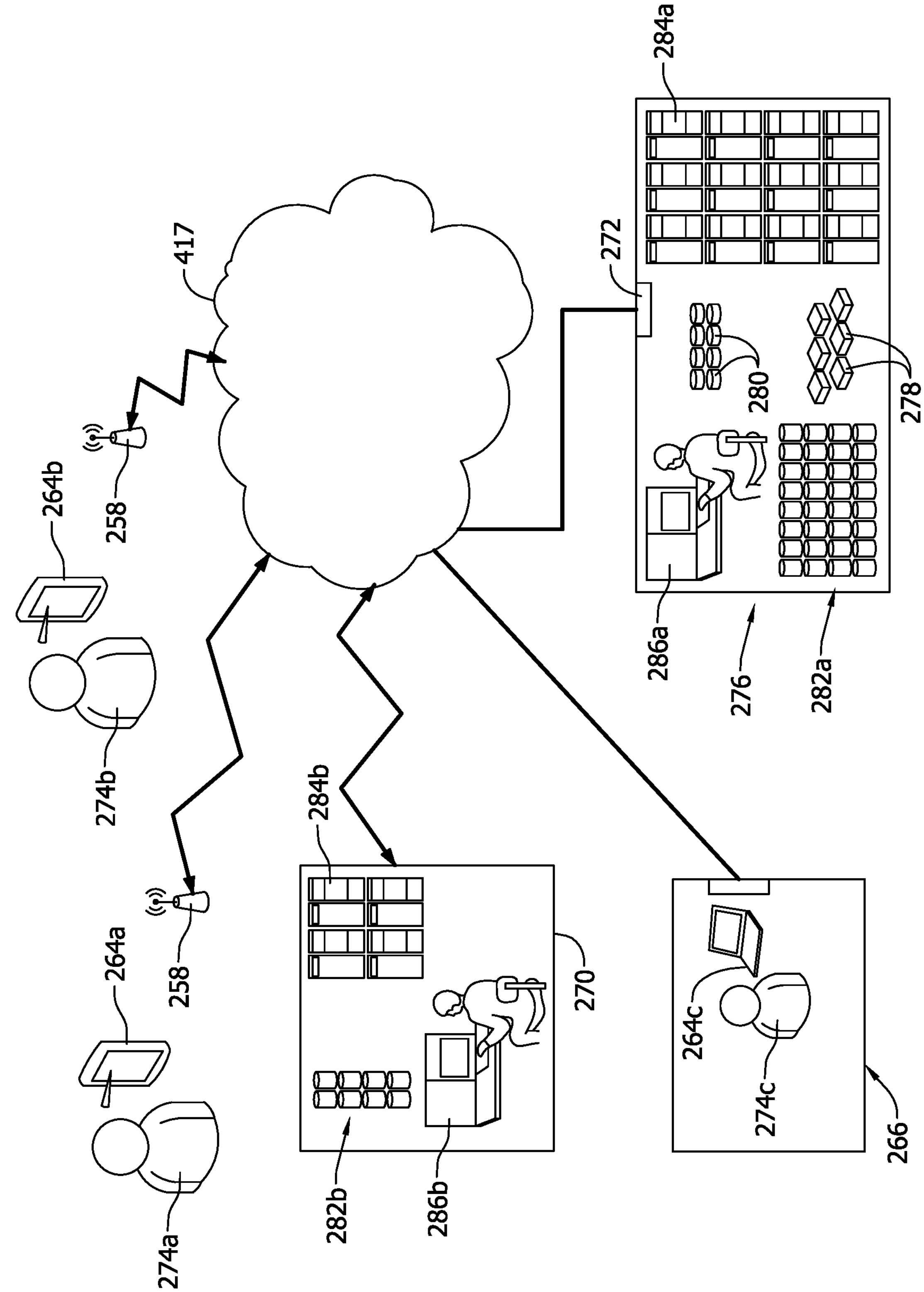
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
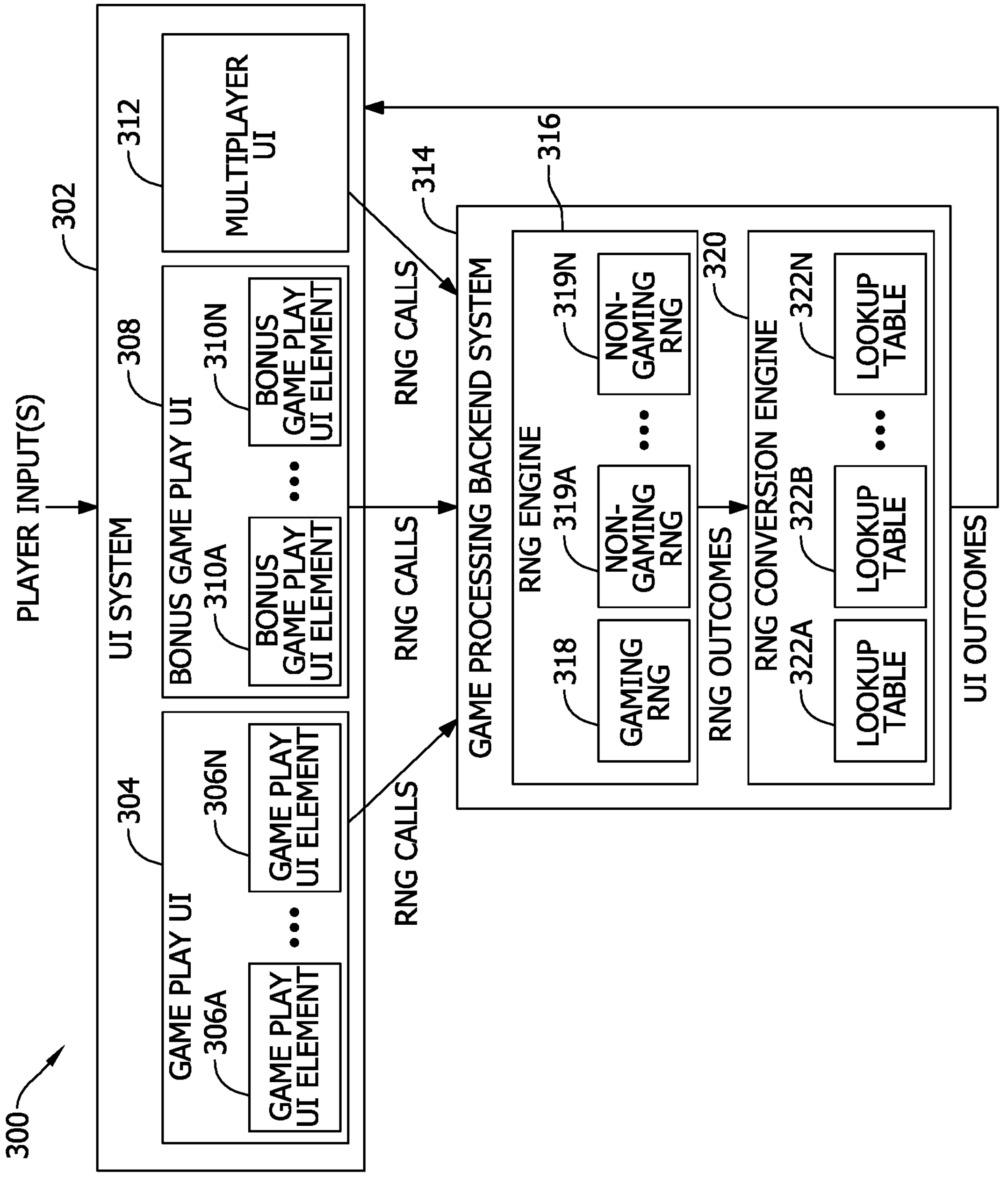
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
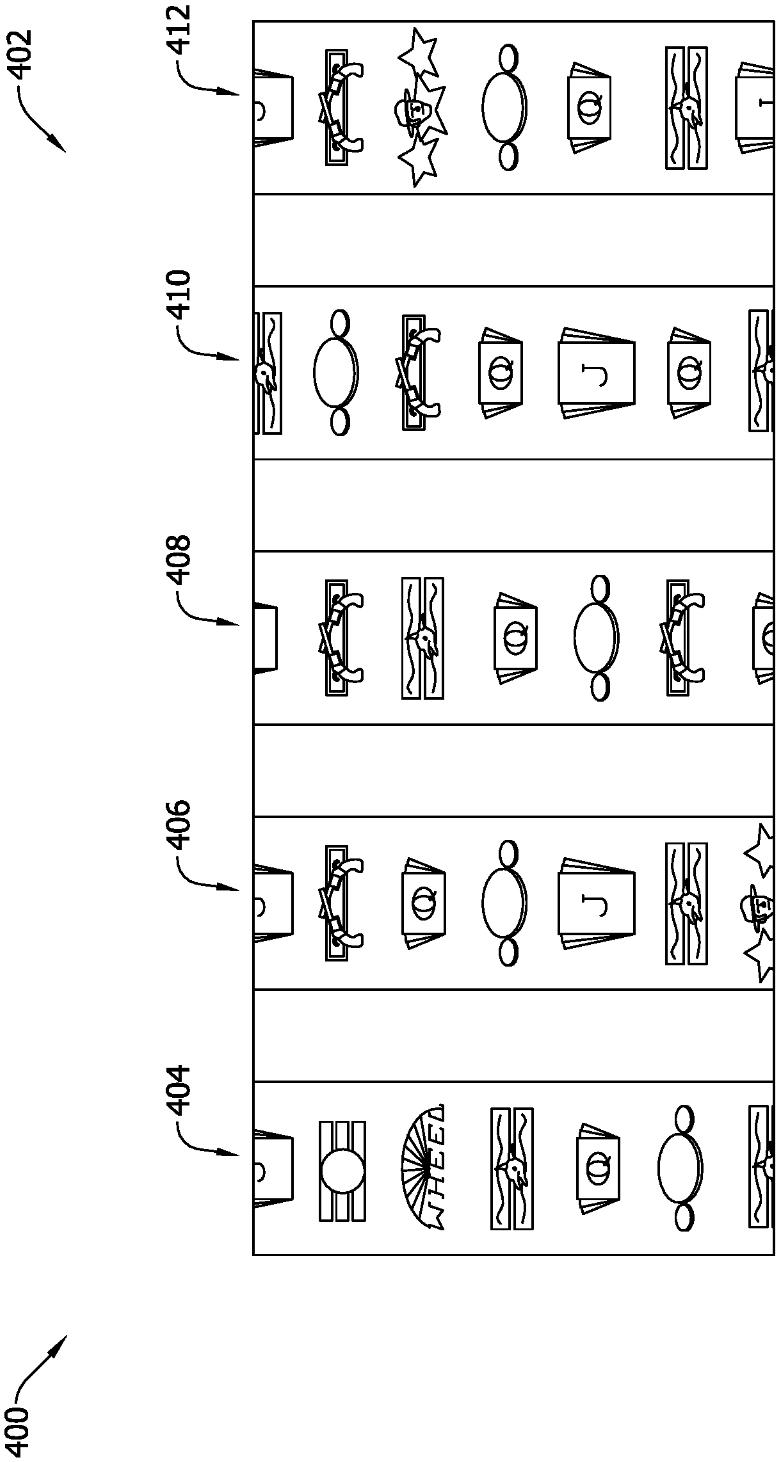
FIG. 4 illustrates an example screenshot and/or interface of an electronic game, as described herein.
Figure 5:
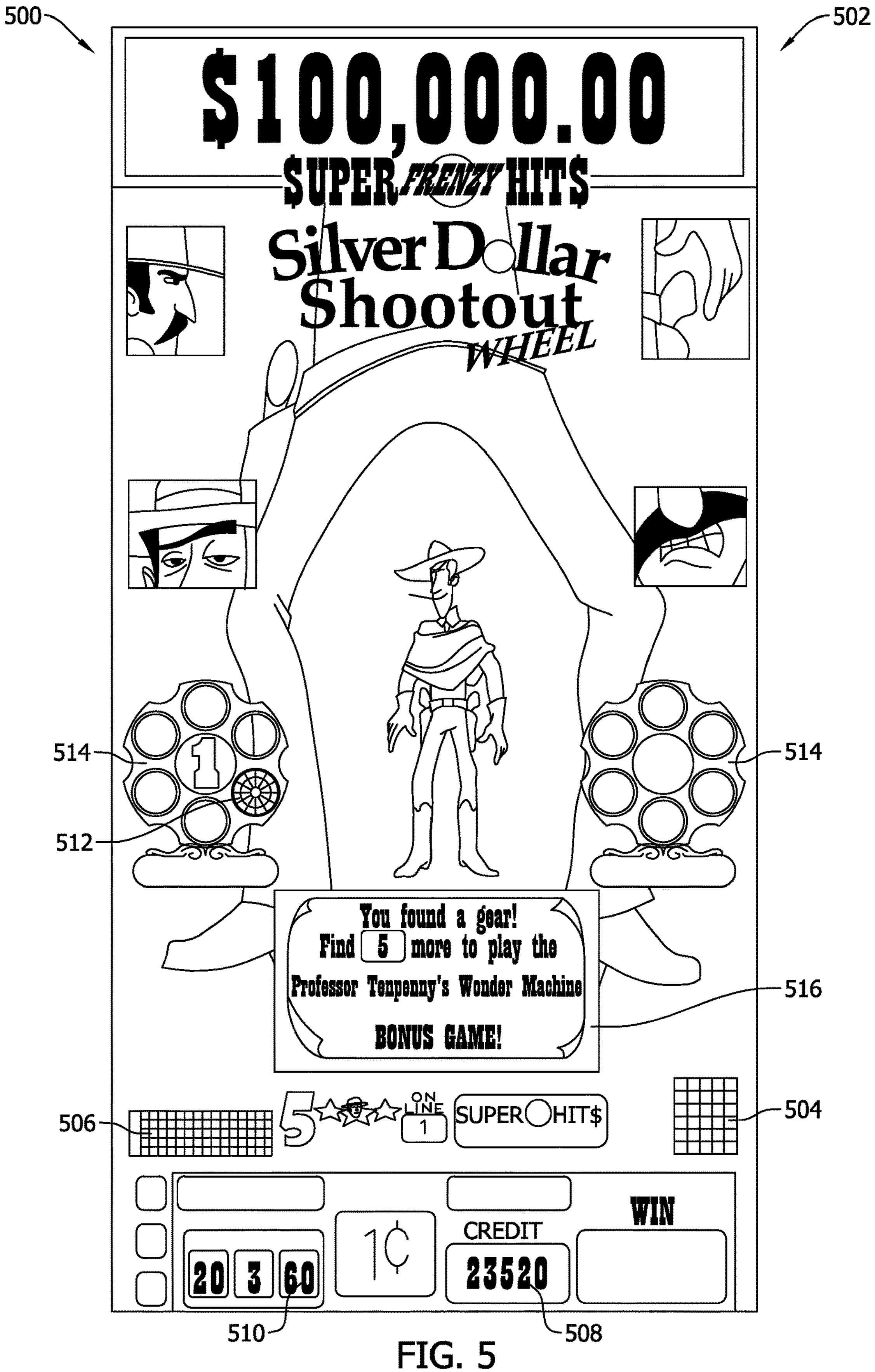
FIG. 5 illustrates another example screenshot and/or interface of the electronic game shown in FIG. 4.
Figure 6:
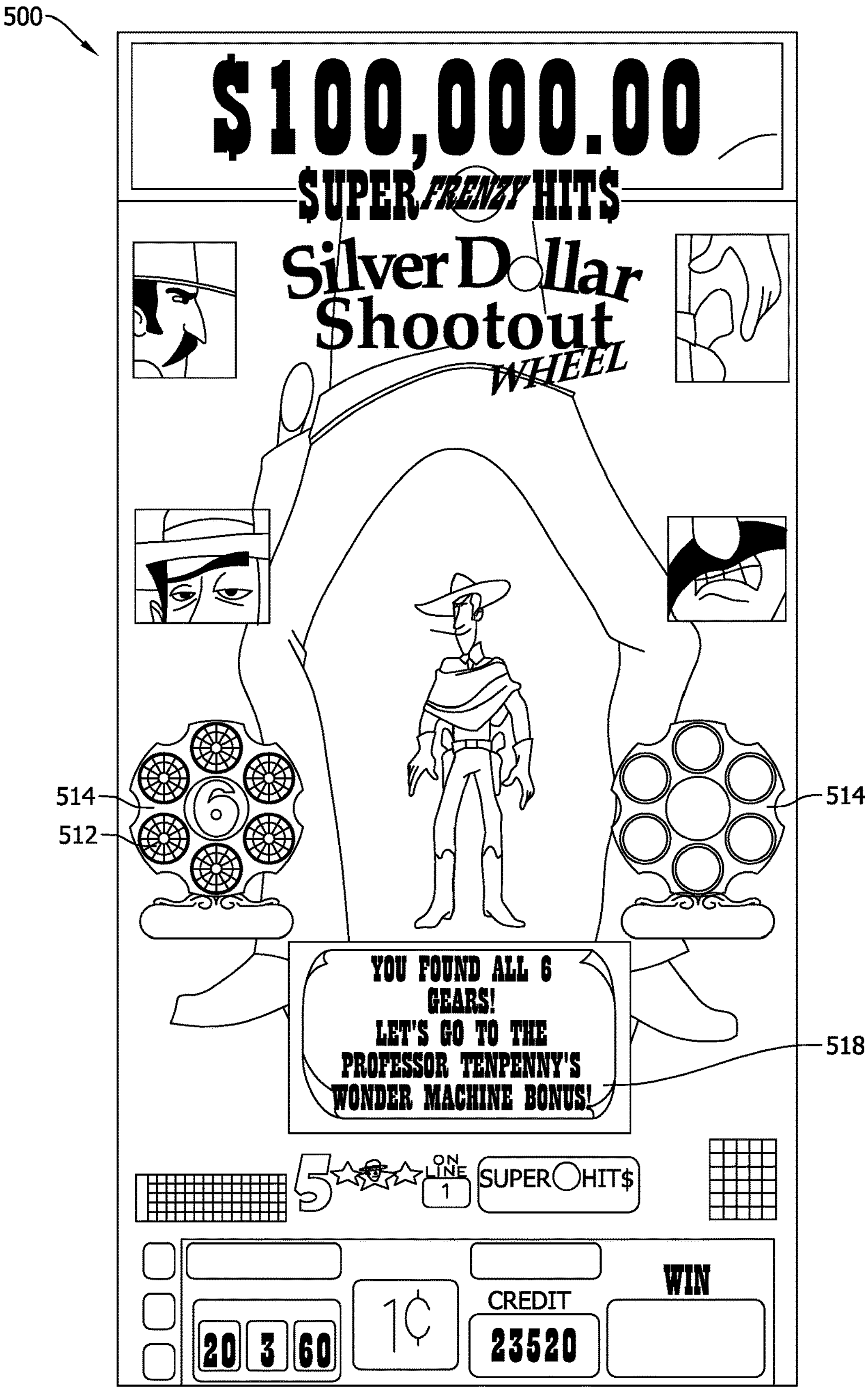
FIG. 6 illustrates another example screenshot and/or interface of the electronic game shown in FIG. 4.

FIG. 4 illustrates an example screenshot and/or interface 400 of an electronic game, as described herein. FIG. 5 illustrates another example screenshot and/or interface 500 of the electronic game shown in FIG. 4. FIG. 6 illustrates another example of screenshot and/or interface 500 of the electronic game shown in FIG. 4.

In the example embodiment, the electronic game shown in FIGS. 4-6 is a Class II bingo game presented on a gaming device (e.g., gaming devices 104A-104X). A primary game display area 402 includes a plurality of reels 404-412. While five reels 404-412 are shown in the example of FIG. 4, in some examples, more or fewer reels may be used. In some examples, reels 404-412 may be implemented as mechanical reels or may include virtual reels that are computer generated and displayed on a computer display screen/display device. As shown, each reel 404-412 has a plurality of symbol display positions for presenting symbols (and/or symbol combinations) which may be associated with winning and/or losing reel game outcomes and/or awards.

In the example of FIG. 5, a secondary game display area 502 includes a bingo card 504 and a bingo number listing 506. As shown, bingo card 504 includes a matrix of bingo cells (e.g., squares). In some examples, the matrix may be a 5×5 matrix of 25 total cells. In some examples, bingo card 504 may have a matrix of a different size (e.g., 3×3, 4×4, 4×5, 4×6, 6×6, 7×7, 3×8, 10×10, etc.). In some examples, the matrix may be larger or smaller. In the example of FIG. 5, each cell in the matrix of bingo card 504 includes a number that is not repeated in any other cell of bingo card 504.

In the example of FIG. 5, secondary game display area 502 further includes a credit meter 508 showing an amount of money and/or credits (e.g., credit balance associated with a player account) at a gaming device. In FIG. 5, credit meter 508 shows 23520 credits. Secondary game display area 502 additionally includes a wager meter 510 adjacent to credit meter 508 indicating an amount wagered (e.g., based on a denomination and/or number of pay lines selected).

In some examples, the bingo game may be a networked game that involves two or more networked devices, such as gaming devices 104A-104X. For example, many electronic bingo games may be required, by state gaming regulations, to include at least two players. As a result, in these circumstances, a bingo game can only occur if two or more players have placed wagers and received a bingo card to be used to determine a game outcome against a common ball call. A ball call may be initiated once at least two players have joined an electronic bingo game (e.g., a networked electronic bingo game), and each player's bingo card (or cards) are compared to the same ball call, even where the players are physically separated, such as in different parts of a casino or even in different casinos/external locations.

Central determination gaming system server 106 may manage (and/or host) the bingo game, such as by generating bingo card 504 (or cards, as above) and/or bingo number listing 506. In some examples, bingo card 504 (and/or information on which the bingo card 504 is based), and/or the bingo number listing 506 may be generated using an RNG (e.g., RNG 318). In some examples, bingo card 504 may be randomly selected from a set of bingo cards or a player may select their own bingo card 504 (e.g., via a user interface), such as from a set of randomly generated bingo cards, for example.

In operation, a player and/or gaming device may be provided with a respective bingo card 504, such as by central determination gaming system server 106. For example, a player may be provided a new bingo card 504 each time a "Spin" or "Play" button is pressed by the player (e.g., via a user interface), provided the player has made a wager/input. In some examples, more than one bingo card 504 may be generated in response to a wager. Bingo number listing 506 (e.g., "ball call") may be randomly generated, such as by central determination gaming system server 106. Bingo card 504 may be compared to bingo number listing 506, and the numbered cells on bingo card 504 that match numbers in the bingo number listing 506 may be marked or "daubed" on bingo card 504. Finally, the marked or daubed bingo card 504 may be evaluated against a paytable of winning bingo patterns.

Bingo number listing 506 may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in bingo number listing 506. Other game-ending patterns are also possible. When the game-ending pattern is awarded, bingo number listing 506 is reset, for all players participating in the bingo game and the process repeats. In some examples, a single play of the bingo game includes a wager, a bingo card 504, a bingo number listing 506, a matching of the numbers called with those on a bingo card 504, a determination of a bingo game outcome, and a presentation of an associated award, if any.

A bingo game outcome may be determined by comparing one or more patterns of marked (and/or "daubed) cells of bingo card 504 with a paytable of winning bingo patterns. If bingo card 504 does not include a pattern that matches a pattern in the paytable of winning patterns, then a losing bingo outcome is determined, and no award may be provided to the player. If bingo card 504 does include a pattern that matches a pattern in the paytable of winning patterns, then a winning bingo outcome is determined, and a reward may be provided to the player.

Different winning patterns may be associated with different awards. The award for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player/player account may be awarded for multiple patterns (e.g., all winning patterns) that are matched when bingo card 504 is evaluated against the paytable of winning patterns. In some examples, the player may be awarded for only the highest priority pattern (e.g., the highest paying winning pattern) that is matched. In some examples, during play of a Class II game, a player is provided or selects a single bingo card 504 for multiple plays of the bingo game, with a new bingo number listing 506 generated for each play of the bingo game. Other methods of play of a Class II bingo game, Class III games, and/or other games are also envisioned and are within the scope of this disclosure.

The bingo game outcome may be presented to the player via a spinning reel game simulation. In the example of FIG.

4, the spinning reel game is simulated via plurality of reels 404-412 in primary game display area 402. For each play of the bingo game, the bingo game outcome is presented at least in part as a reel spin outcome in the reel game. In some examples, the spinning reel game simulation may operate by spinning each reel 404-412 and then stopping each reel 404-412 in a particular position to obtain a matrix of symbols.

One or more combinations of symbols in the matrix of symbols may be associated with a reel game outcome that is equal to at least a portion of the main bingo game outcome. For example, a winning bingo game outcome may be displayed as a winning combination of reels 404-412. Similarly, a losing bingo game outcome may be displayed as a losing combination of reels 404-412. Different outcomes of the bingo game may be displayed as different outcomes in the spinning reel game. Thus, the bingo game outcome is presented to the player at least in part as a particular reel spin outcome of reels 404-412.

In the example embodiment, winning outcomes may be displayed as a combination of game outcomes in primary game display area 402 and secondary game display area 502 (e.g., a bonus game in secondary game display area 502 as shown in FIGS. 7-19). For example, a total bingo game outcome may be determined, followed by determination of a script of base game display patterns/sequences, bonus game display patterns/sequences, and/or feature game display patterns/sequences (e.g., corresponding to game outcomes in primary game display area 402 and/or secondary game display area 502) that, in total, correspond to the determined game outcome (e.g., sequential display of the patterns/sequences of the script results in the desired game outcome being displayed/provided—in some embodiments, patterns/sequences of the script may be arranged/organized in an order from a lowest value to a highest value). In some embodiments, separate bingo game outcome determinations may be made for spins of the electronic game shown in FIGS. 4-6 (e.g., a base game) and spins of the electronic game shown in FIGS. 7-19 (e.g., a bonus game).

In some examples, progressively increasing outputs may be applied to a Class II game as described herein. Game outputs (e.g., credit outputs) may be presented/paid from lowest to highest across a plurality of spins. A number of spins may be determined based upon an amount of a bingo game win or a number of bingo pattern wins, as examples. Sequential display of display patterns/sequences may be controlled until display/communication of a determined number of bingo pattern amounts has been achieved.

In the example embodiment, a game outcome is randomly determined (e.g., by comparing a ball call (e.g., 506) to a bingo card (e.g., 504), by use of an RNG, etc.). A lookup is then performed (e.g., by a game controller and/or based upon an RNG output) in a lookup table (e.g., 322A-N) to determine how to present the total game outcome (e.g., which script/sequence of outcomes to display). FIGS. 4 and/or 9-13 illustrate one particular scripted sequence, for example.

In some embodiments, a random determination may be made to determine which fractions of the total game outcome should be presented by each possible game (e.g., base game, bonus game, etc.). For example, an RNG (e.g., RNG 318 and/or 319A-N) and a data structure and/or lookup table (e.g., 322A-N) may be utilized in order to make the determination of how the total game outcome should be split up amongst different game outcomes. In the example of a 100-credit outcome, the lookup table may include any number of fractions/portions/splits between a base game and/or a bonus game that sum up to 100 credits. In this example, upon the random determination of how the total game outcome will be split amongst different games (e.g., 30-70, 40-60, etc.), another random determination may be made (e.g., based upon the same or a different lookup table) to determine how to display the respective fractions/portions.

For example, if the determined split is a 30-70 split between a base game and a bonus game, there are a plurality of ways to display/communicate a 30-credit base outcome and a 70-credit bonus outcome. Accordingly, one or more next random determinations may be made, based upon the same or a different lookup table, to determine, continuing the example above, which base display sequence (e.g., sequence of spins and displayed symbol outcomes) to use to communicate a 30-credit base outcome and which bonus display sequence (e.g., sequence of spins and displayed symbol outcomes) to use to communicate a 70-credit feature outcome.

For example, the lookup table may be configured as a data structure and/or model such that, based upon an inputted/determined total game outcome amount, a script of which display sequence(s) to use to communicate the game outcome amount (e.g., to a player) may be determined. In some embodiments, an RNG output may be utilized to determine which script to use to communicate a particular game outcome amount. In other words, a total game outcome amount may be determined. Based upon the total game outcome amount, the lookup table can be searched for a set of scripts that correspond to that particular game outcome amount (e.g., the set of scripts may include spins/rounds of a base game, feature game, and/or bonus game, etc.). Then, an RNG output may be utilized to randomly determine which script of the set of scripts associated with the particular game outcome amount to utilize to communicate/convey the game outcome amount.

In the example embodiment, a base game may be a reel game as shown in FIG. 4. Trigger symbols 512 (e.g., unlock symbols) may be provided as shown in FIGS. 5 and 6. Upon detection of a predetermined number of trigger symbols 512 (or detection of another trigger condition) being displayed (e.g., in one of cylinders 514), a bonus game, as shown in FIGS. 7-19, may be triggered. In some embodiments, cylinders 514 may be associated with the same bonus game, different bonus games, and/or other bonuses (e.g., multipliers, free spins, etc.).

In the example embodiment, trigger symbols 512 may be added to a cylinder 514 when a losing base game outcome is presented on reels 404-412. In some embodiments, upon a losing base game outcome being presented, a random determination (e.g., based on an RNG 318 output) may be made to determine whether or not to add trigger symbol 512 to at least one of cylinders 514. In some embodiments, trigger symbol 512 may be added to at least one of cylinders 514 each time a losing base game outcome is presented. Other trigger conditions that result in bonus symbols being added to at least one of cylinders are also envisioned.

Display area 516 is also provided in the example of FIG. 5. As explained in display area 516, one trigger symbol 512 is provided in left cylinder 514. Accordingly, five additional trigger symbols 512 are needed in left cylinder 514 to complete left cylinder 514 with trigger symbols 512 and thus to trigger the bonus game (e.g., the bonus game shown in FIGS. 7-19). Thus, at least because of the efficient use of display space to include the display features provided (e.g., trigger symbols 512, cylinders 514, display area 516), players can easily understand how the bonus game will be triggered. Additional and/or alternative triggers for the bonus game are also envisioned.

In other words, display areas 402, 502 for a base game different from the bonus game may be displayed and, for each play of the base game, it is randomly determined whether to add an unlock symbol (e.g., trigger symbol 512) to one or more cylinders 514 (e.g., each including additional display areas where trigger symbols 512 may be provided) upon each non-winning outcome of the base game. Then, upon each display area of the plurality of display areas including trigger symbol 512, the bonus game is caused to be initiated.

FIG. 6 illustrates another example of screenshot and/or interface 500 where left cylinder 514 is complete with trigger symbols 512. Accordingly, a message 518 (e.g., an animation) is provided that indicates that a bonus game has been triggered.

Figure 7:
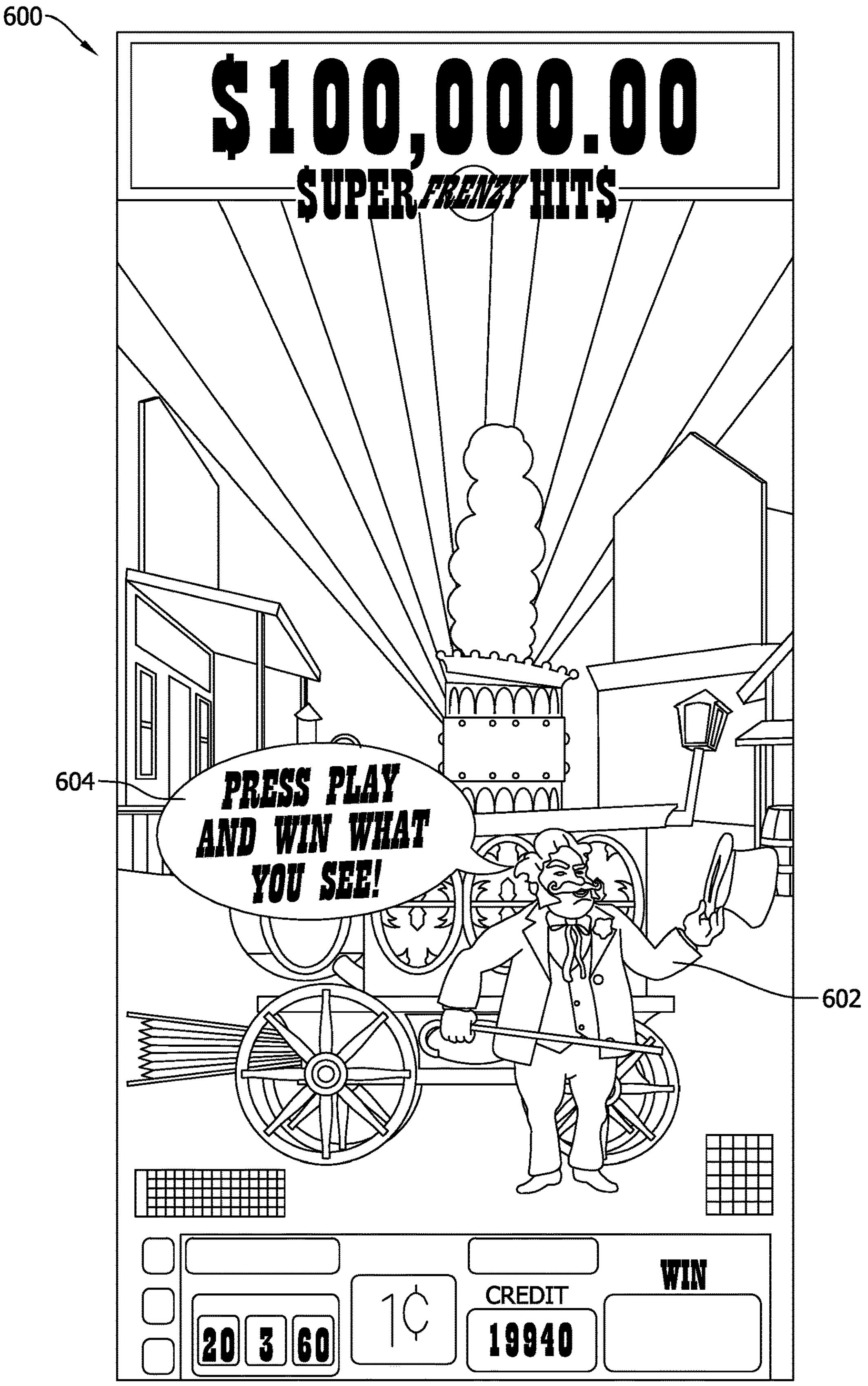
FIG. 7 illustrates another example screenshot and/or interface of another electronic game, as described herein.

FIG. 7 illustrates another example of screenshot and/or interface 600 of an electronic game, as described herein. As shown in screenshot and/or interface 600, a bonus game, corresponding to the base game shown in FIGS. 4-6, is provided. In FIG. 7, an animation 602 is provided along with a display area 604 to communicate to the player how to initiate the bonus game, now that the bonus game has been triggered (e.g., in this example, selecting/providing an input at a play button).

Figure 8:
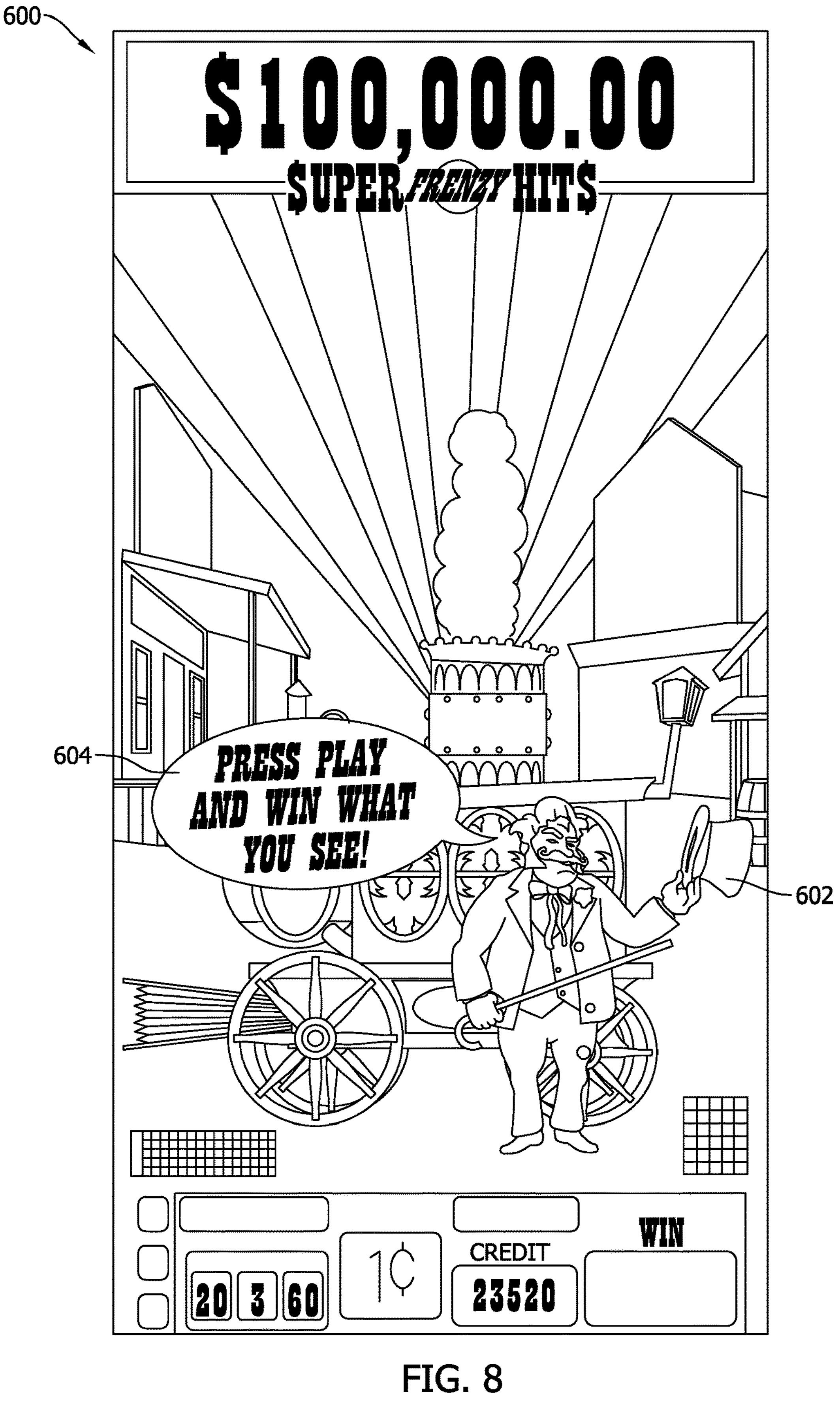
FIG. 8 illustrates another example screenshot and/or interface of the electronic game shown in FIG. 7.

FIG. 8 illustrates another example of screenshot and/or interface 600, including animation 602 and display area 604.

Figure 9:
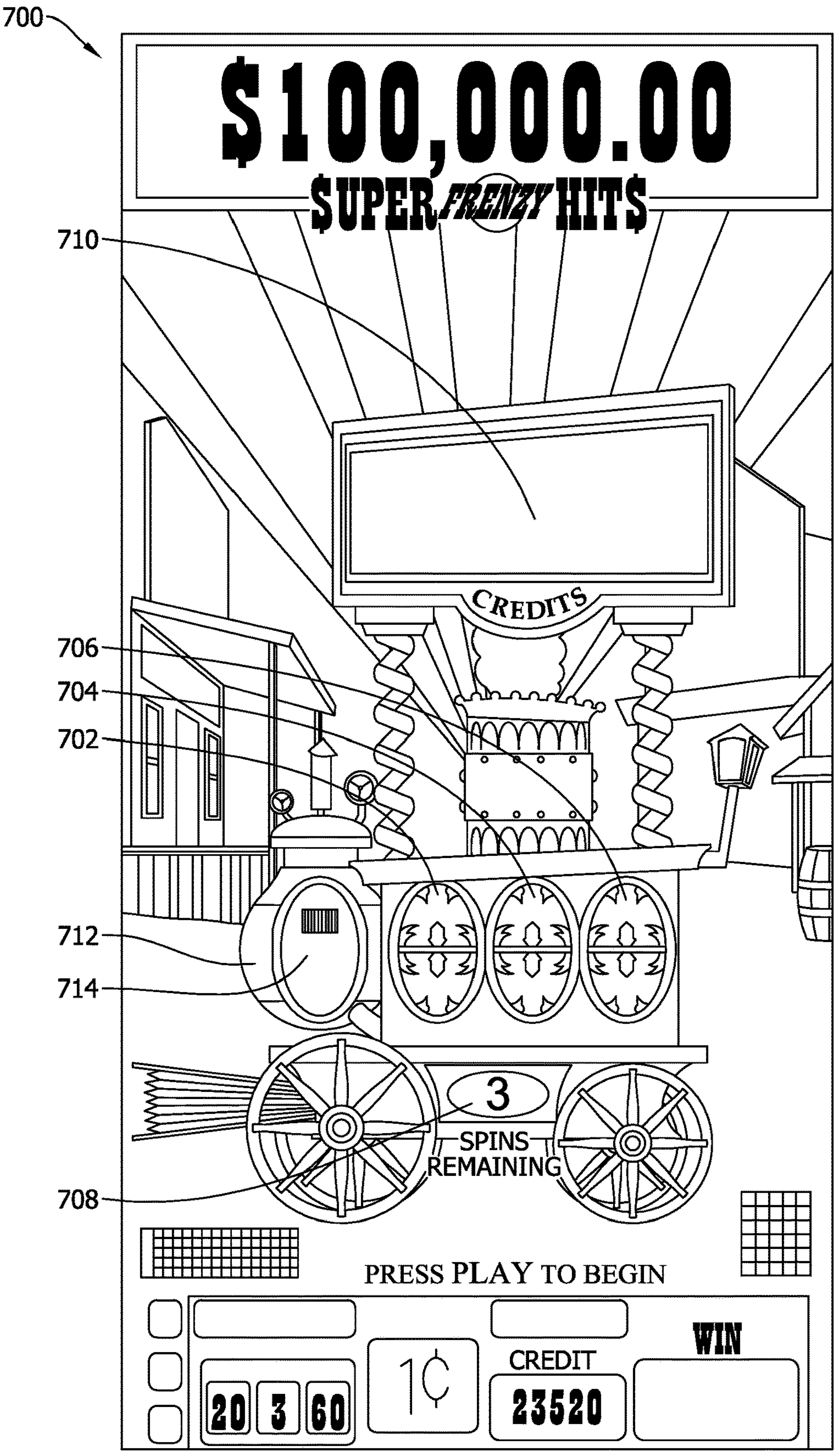
FIG. 9 illustrates another example screenshot and/or interface of the electronic game shown in FIG. 7.

FIG. 9 illustrates another example screenshot and/or interface 700 of the electronic game shown in FIG. 7. As shown in screenshot and/or interface 700, the example bonus game described herein is provided. In some embodiments, the bonus game shown in FIGS. 7-19 may be an electronic game (e.g., a base game) that does not require triggering from a different electronic game.

In the example of FIG. 7, a digit-based reel game and a number of free spins are provided. Initially, symbol positions 702-706 are provided along with a spin counter 708 (e.g., indicating the number of free spins for the bonus game) and a bonus game credit meter 710. In some embodiments, display areas 702-706 are reels. The reels may then spin for a number of free spins until a predetermined bonus game outcome (e.g., based on a ball call (e.g., 506) and a bingo card (e.g., 504), as explained herein) is satisfied/provided.

In the example embodiment, a script including outcomes may be randomly selected from stored bins/pools of possible outcomes in a lookup table for each particular play of the bonus game (e.g., each time the bonus game is initiated/triggered, as explained herein). For example, a wide variety of bonus game display patterns may be stored in a lookup table (e.g., 322A-N) and randomly selected for each particular bonus game outcome (e.g., if it is determined that the bonus game outcome should be 100 credits, a plurality of stored display sequences correspond to an 100-credit bonus game outcome).

In some embodiments, bonus game outcomes may only be provided if the bonus game outcome is greater than a predefined output amount. For example, a bonus game may not be selected if the bonus outcome is less than a predefined number of credits. In other words, bonus games are meant to be satisfying and exciting for players. After triggering a bonus game, a player may be disappointed if the bonus outcome is zero credits (e.g., or less credits than the base game outcome). Accordingly, display sequences that include bonus game outcomes may only be selected if the included bonus outcomes correspond to credit/output amounts greater than a predefined number of credits (e.g., or a certain ratio with respect to one or more base game outcomes). In some embodiments, display sequences that do not satisfy a predetermined threshold amount of credits may be removed from a lookup table.

FIGS. 9-13 illustrate an example display sequence for the bonus game described herein. As indicated above, first symbol position 702, second symbol position 704, and third symbol position 706 are initially provided along with spin counter 708 and bonus game credit meter 710. As shown, spin counter 708 indicates that three spins are provided for the bonus game.

In the example of FIG. 9, it has been determined that at least four symbols will be displayed in an outcome and/or a symbol will be displayed at a fourth symbol position 712 and, in response to determining that the at least four symbols will be displayed and/or a symbol will be displayed at fourth symbol position 712, fourth symbol position 712, that was not previously displayed, is now displayed. In the example embodiment, fourth symbol position 712 may only appear when, for the first time during the play of the bonus game, it has been determined that a symbol will appear therein (e.g., to communicate to the player that a symbol will appear therein and to not build excitement only for a symbol to not be displayed therein).

In some embodiments, a symbol may not appear at fourth symbol position 712 during each spin of the bonus game for which fourth symbol position 712 is displayed. In some embodiments, fourth symbol position 712 may be displayed during all of the bonus game. In some embodiments, an animation may be provided when fourth symbol position 712 is initially displayed for a play of the bonus game (e.g., popping out from behind at least one of symbol positions 702-706).

In some embodiments, when a symbol will be shown at fourth symbol position 712, an animation may be provided that shows a change to fourth symbol position 712 to indicate that a symbol will be provided therein. In the example of FIG. 9, the animation may be a door 714 of fourth symbol position 712 opening.

Figure 10:
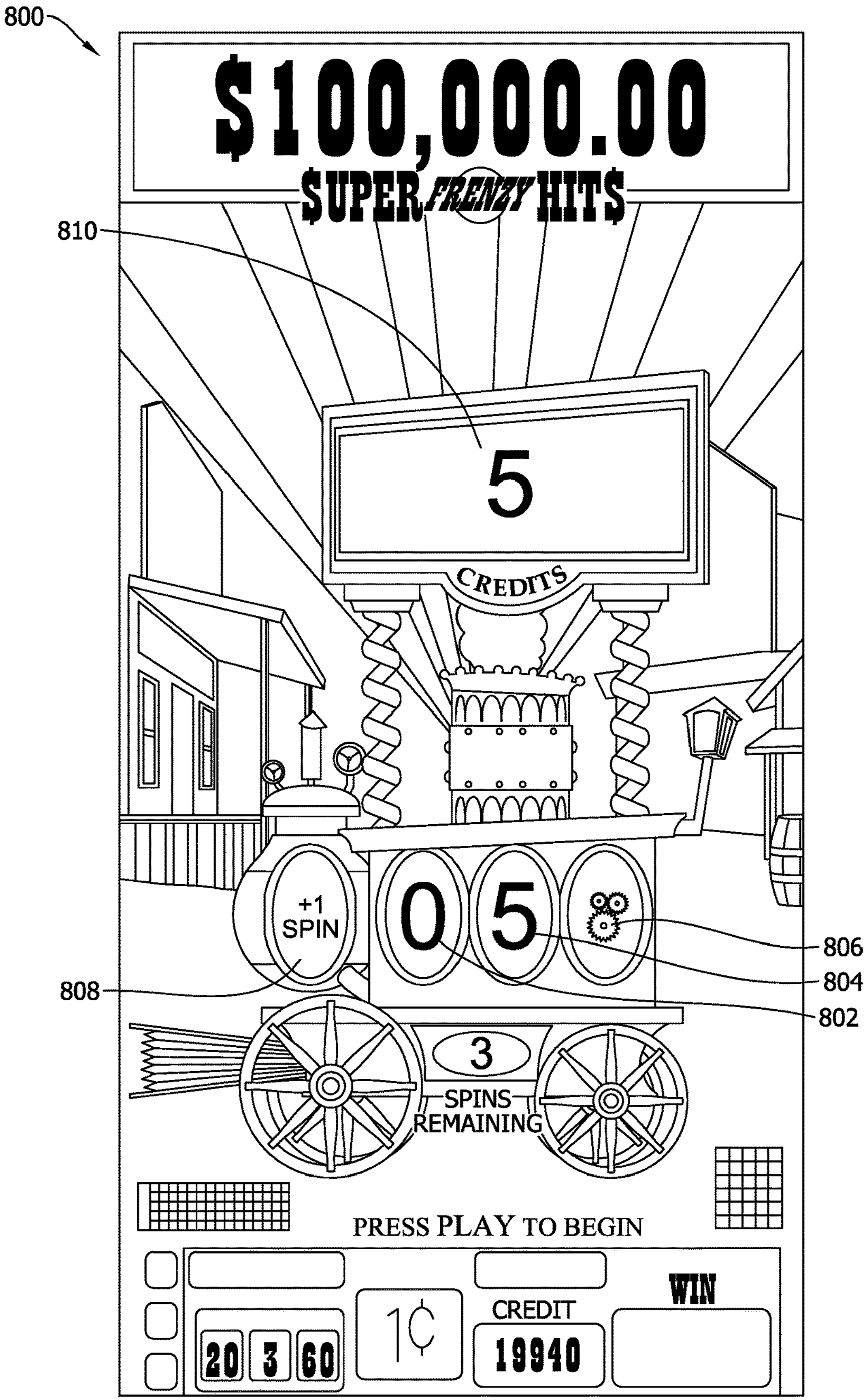
FIG. 10 illustrates another example screenshot and/or interface of the electronic game shown in FIG. 7.

FIG. 10 illustrates another example screenshot and/or interface 800 of the electronic game shown in FIG. 7. Advancing from FIG. 9, FIG. 10 illustrates symbols 802-808 associated with a spin outcome displayed at symbol positions 702-706, 712.

As shown in FIG. 10, symbol 808 is an additional spin symbol. Thus, an additional spin is provided for the bonus game, and spin counter 708 still indicates that three spins remain.

As illustrated in FIG. 10, first symbol position 702, second symbol position 704, third symbol position 706, and fourth symbol position 712 are arranged in a side-by-side arrangement. Symbol 806, as shown at third symbol position 706, is a blank symbol. Other symbols 802, 804 include respective numerical digits.

In FIG. 10, symbols 802, 804 are included to the left of symbol 806 (e.g., a blank symbol). Accordingly, digits associated with symbols 802, 804 are concatenated to generate a concatenated number 810. Concatenated number 810 is associated with an output amount that is provided to the player and displayed at bonus game credit meter 710.

In some embodiments, if an additional symbol including a digit was displayed to the right of symbol 806, that digit would be added to concatenated number 810 to an output amount.

In some embodiments, where multiple symbols including digits are provided to the right of a blank symbol and a single digit is provided to the left of the blank symbol, the digits to the right of the blank symbol are concatenated to generate a concatenated number, and that concatenated number is added to the numerical digit displayed to the left of the blank symbol to generate an output amount.

In some embodiments, where multiple symbols associated with numerical digits are included to the right and to the left of the blank symbol, the numerical digits to the left of the blank symbol may be concatenated to generate a first concatenated number and the numerical digits to the right of the blank symbol may be concatenated to generate a second concatenated number. Then, the first concatenated number may be added to the second concatenated number to generate an output amount.

In some embodiments where a blank symbol is at least one of a leftmost symbol (e.g., at fourth symbol position 712) or a rightmost symbol (e.g., at fifth symbol position 902, see FIG. 11) numerical digits associated with symbols different from the blank symbol may be concatenated to generate an output amount.

Figure 11:
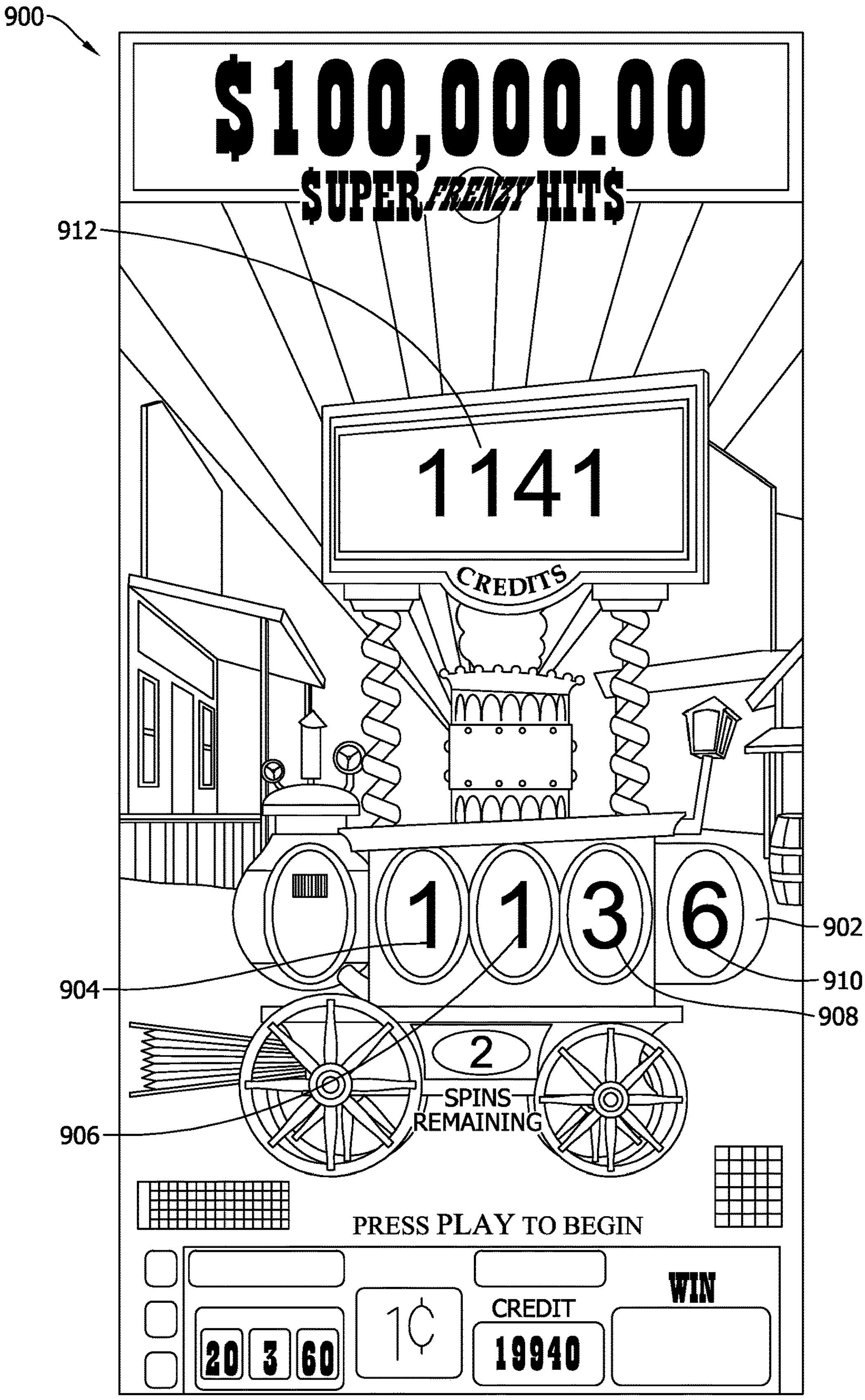
FIG. 11 illustrates another example screenshot and/or interface of the electronic game shown in FIG. 7.

FIG. 11 illustrates another example screenshot and/or interface 900 of the electronic game shown in FIG. 7. As shown in screenshot and/or interface 900, it has been determined that a symbol will be displayed at a fifth symbol position 902. Accordingly, similar to the way fourth symbol position 712 was introduced (e.g., as explained above with respect to FIG. 9), fifth symbol position 902 is added.

In the example of FIG. 11, it has been determined that at least four symbols will be displayed in an outcome and/or a symbol will be displayed at a fifth symbol position 902 and, in response to determining that the at least four symbols will be displayed and/or a symbol will be displayed at fifth symbol position 902, fifth symbol position 902, that was not previously displayed, is now displayed. In the example embodiment, fifth symbol position 902 may only appear when, for the first time during the play of the bonus game, it has been determined that a symbol will appear therein (e.g., to communicate to the player that a symbol will appear therein and to not build excitement only for a symbol to not be displayed therein).

In some embodiments, a symbol may not appear at fifth symbol position 902 during each spin of the bonus game for which fifth symbol position 902 is displayed. In some embodiments, fifth symbol position 902 may be displayed during all of the bonus game. In some embodiments, an animation may be provided when fifth symbol position 902 is initially displayed for a play of the bonus game (e.g., popping out from behind at least one of symbol positions 702-706, 712, see FIG. 17).

In some embodiments, when a symbol will be shown at fifth symbol position 902, an animation may be provided that shows a change to fifth symbol position 902 to indicate that a symbol will be provided therein. In the example of FIG. 11, the animation may be a door (e.g., see door 1008 in FIG. 12) of fifth symbol position 902 opening (e.g., see FIG. 18).

As shown in FIG. 11, an outcome is provided wherein digits associated with symbols 904-910 are concatenated to generate an output amount (e.g., "1," "1," "3," and "6" are concatenated to generate an output amount of 1136). The output amount is then added to concatenated number 810 to generate an updated output amount 912 for the example electronic game described herein (e.g., 5+1136=1141). In the example of FIG. 11, no symbol is displayed at fourth symbol position 712 and, accordingly, door 714 is displayed as being closed.

Because another spin result has been provided and no additional spin symbol is provided, a spin is deducted from spin counter (e.g., resulting in 2 remaining spins).

Figure 12:
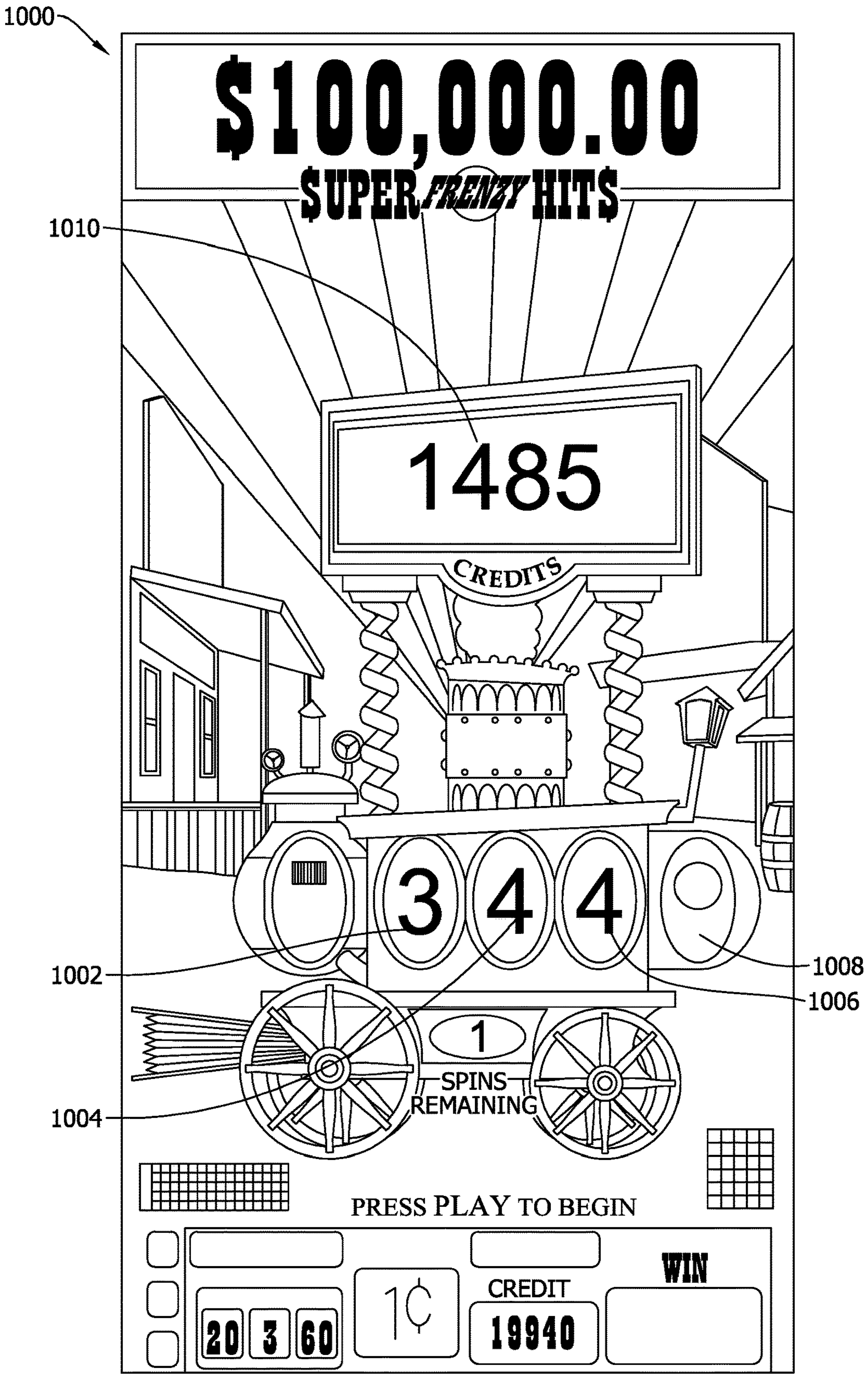
FIG. 12 illustrates another example screenshot and/or interface of the electronic game shown in FIG. 7.

FIG. 12 illustrates another example screenshot and/or interface 1000 of the electronic game shown in FIG. 7. As shown in screenshot and/or interface 1000, a next play of the bonus game includes symbols 1002-1006 displayed at symbol positions 702-706. Because no symbols are displayed at symbol positions 712, 902, doors 714, 1008 are displayed as being closed.

Digits associated with symbols 1002-1006 are concatenated to generate an output amount (e.g., "3," "4," and "4" are concatenated to generate an output amount of 344) that is added to output amount 912 to generate an updated output amount 1010 (e.g., 1136+344=1485).

Because another spin result has been provided and no additional spin symbol is provided, a spin is deducted from spin counter (e.g., resulting in 1 remaining spin).

Figure 13:
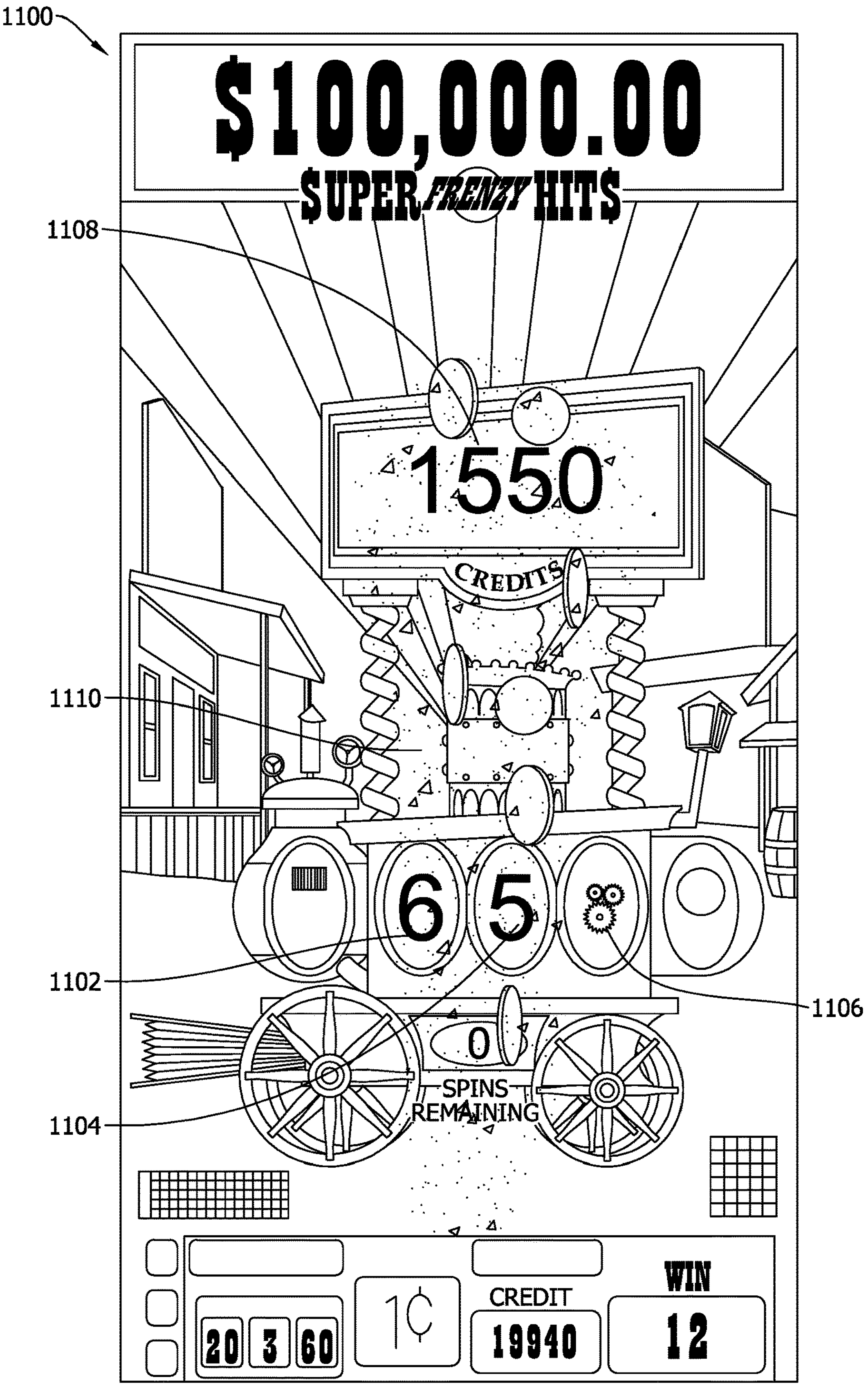
FIG. 13 illustrates another example screenshot and/or interface of the electronic game shown in FIG. 7.

FIG. 13 illustrates another example screenshot and/or interface 1100 of the electronic game shown in FIG. 7. As shown in screenshot and/or interface 1100, a next play of the bonus game includes symbols 1102-1106 displayed at symbol positions 702-706. Because no symbols are displayed at symbol positions 712, 902, doors 714, 1008 are displayed as being closed.

Digits associated with symbols 1102-1106 are concatenated to generate an output amount (e.g., "6," "5," and a blank symbol (e.g., symbol 1106) are concatenated to generate an output amount of 65) that is added to output amount 1010 to generate an updated output amount 1108 (e.g., 1485+65=1550).

Because another spin result has been provided and no additional spin symbol is provided, a spin is deducted from spin counter (e.g., resulting in 0 remaining spins).

As the bonus game has ended (e.g., no spins are remaining), an animation 1110 is provided to indicate to the player at least that the bonus game has ended and/or that output amount 1108 will be provided as a total output amount for the bonus game.

Figure 14:
FIG. 14 illustrates another example screenshot and/or interface of the electronic game shown in FIG. 7.

FIG. 14 illustrates another example screenshot and/or interface 1200 of the electronic game shown in FIG. 7. As explained herein, in some embodiments, digits on either side of a blank symbol (e.g., blank symbol 1106) are concatenated and, after any concatenations, the resulting digits are summed. As shown in FIG. 14, digit 9 and digit 2 are concatenated to 92, which is then summed with 7 to generate an output of 99 credits, as shown.

Figure 15:
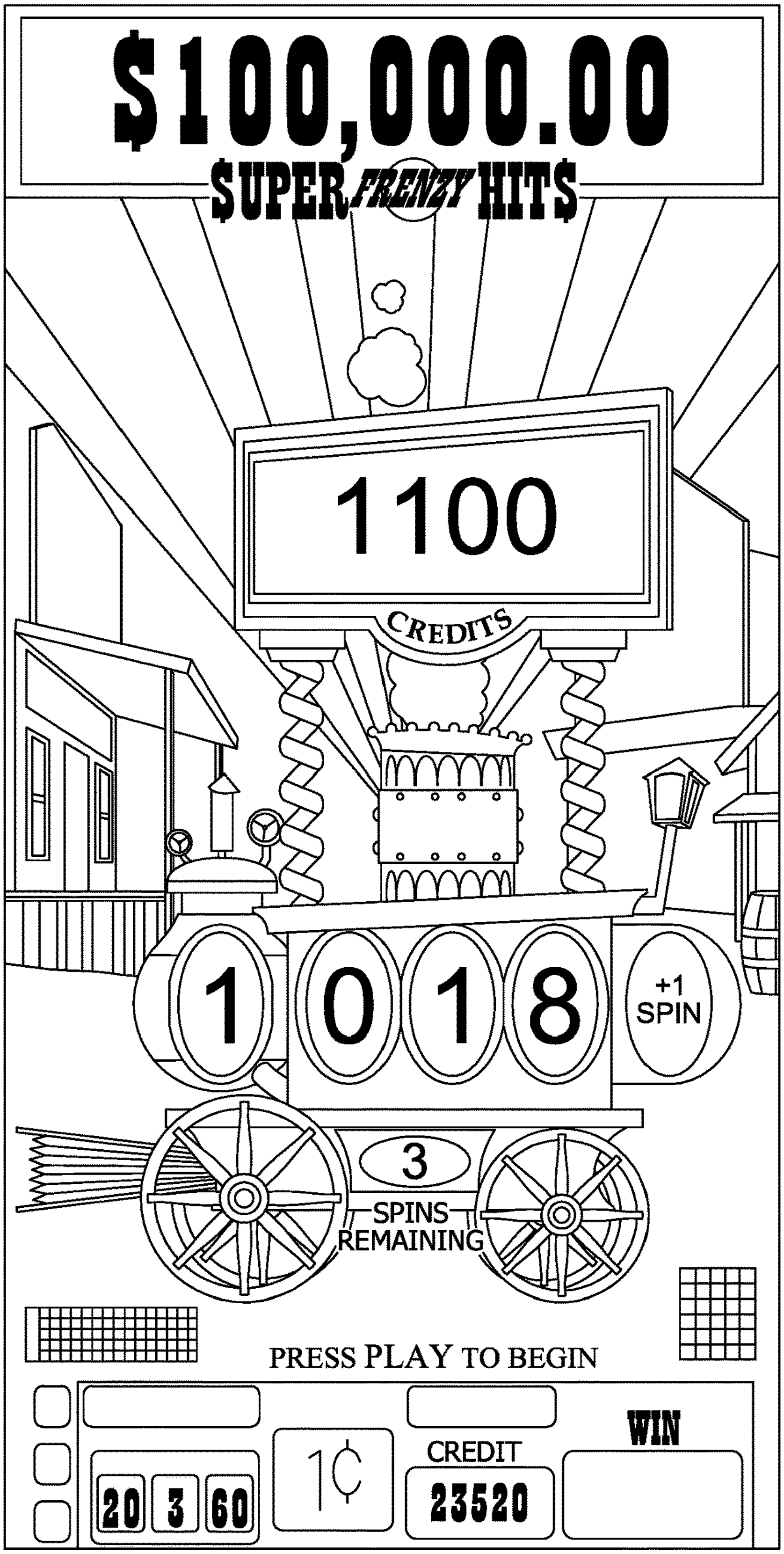
FIG. 15 illustrates another example screenshot and/or interface of the electronic game shown in FIG. 7.

FIG. 15 illustrates another example screenshot and/or interface 1300 of the electronic game shown in FIG. 7. As shown in FIG. 15, all symbol positions include symbols therein (e.g., symbol positions 702-706, 712, 902).

Figure 16:
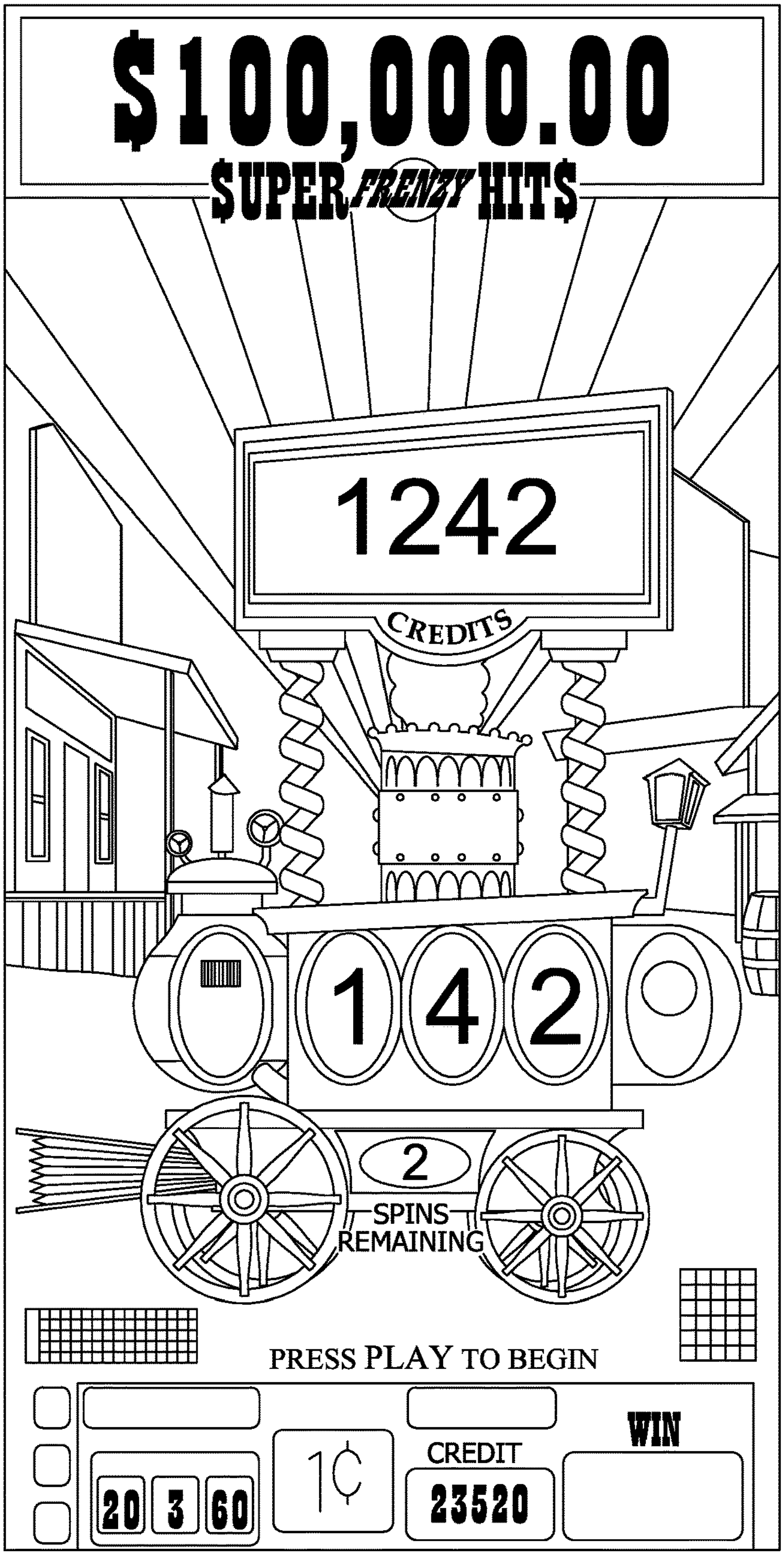
FIG. 16 illustrates another example screenshot and/or interface of the electronic game shown in FIG. 7.

FIG. 16 illustrates another example screenshot and/or interface 1400 of the electronic game shown in FIG. 7 (e.g., continuing the example shown in FIG. 15). As shown in FIG. 16, only three symbols are provided (e.g., at positions 702-706). Accordingly, 142 is added to the total of 1100 shown in FIG. 15, resulting in 1242 credits being the new total shown in FIG. 16.

Figure 17:
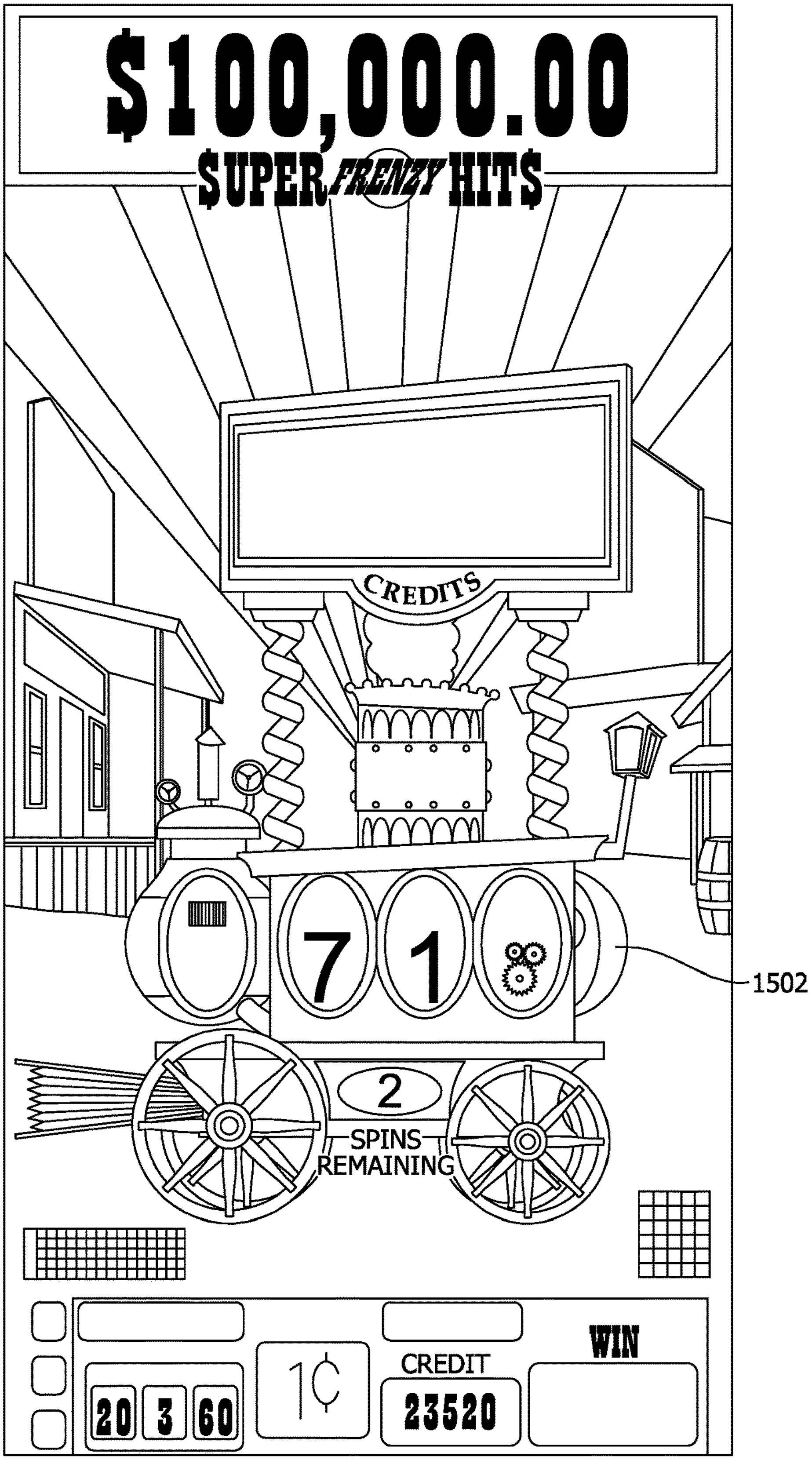
FIG. 17 illustrates another example screenshot and/or interface of the electronic game shown in FIG. 7.

FIG. 17 illustrates another example screenshot and/or interface 1500 of the electronic game shown in FIG. 7. As shown in FIG. 17, an animation 1502 is provided showing that a new symbol position (e.g., symbol position 902) is being added (e.g., the first time a symbol is determined to be shown at symbol position 902 during the game).

Figure 18:
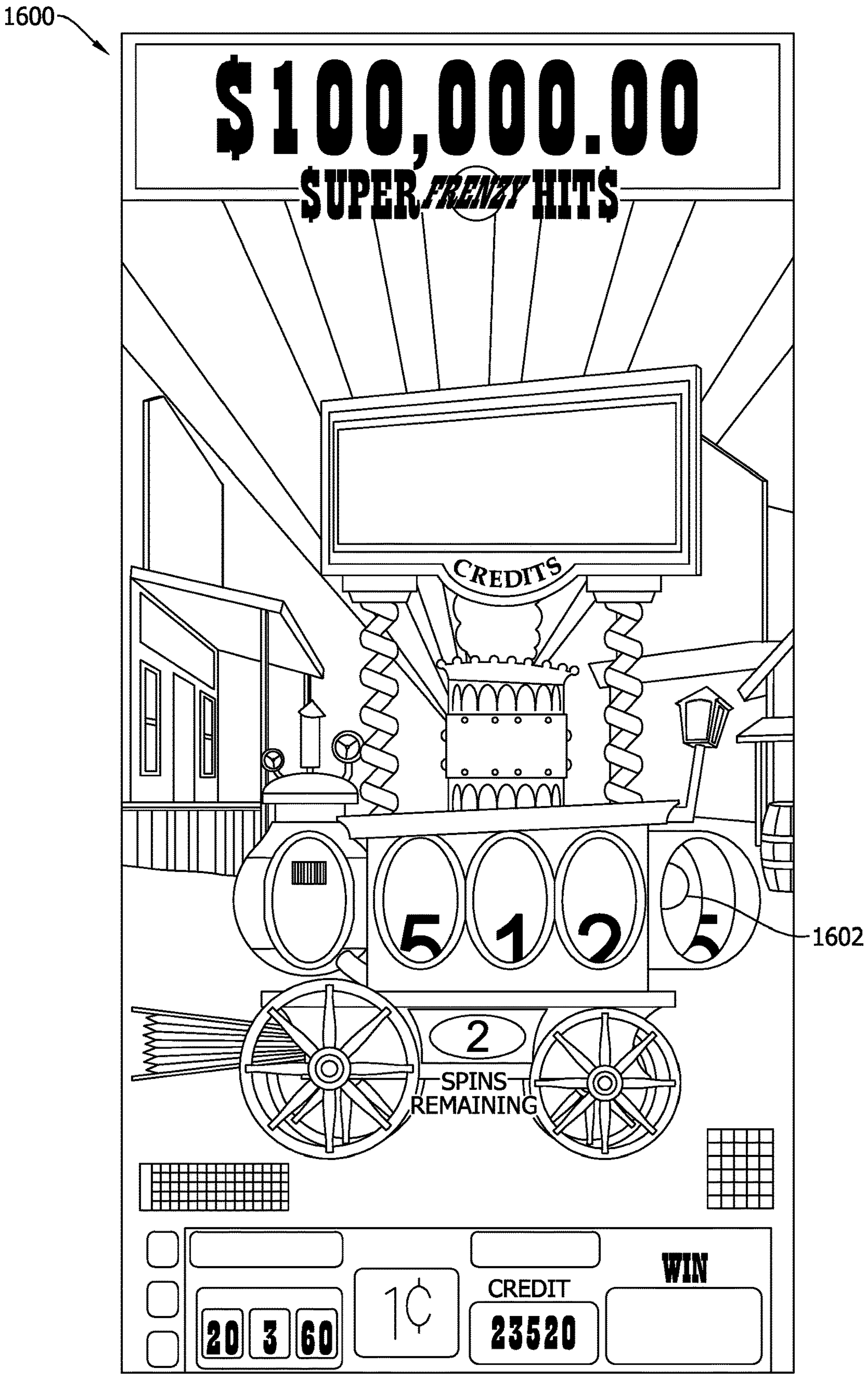
FIG. 18 illustrates another example screenshot and/or interface of the electronic game shown in FIG. 7.

FIG. 18 illustrates another example screenshot and/or interface 1600 of the electronic game shown in FIG. 7. As shown in FIG. 18, an animation 1602 is provided showing that a symbol will appear in a previously shown symbol position (e.g., door 1008 opens at symbol position 902).

Figure 19:
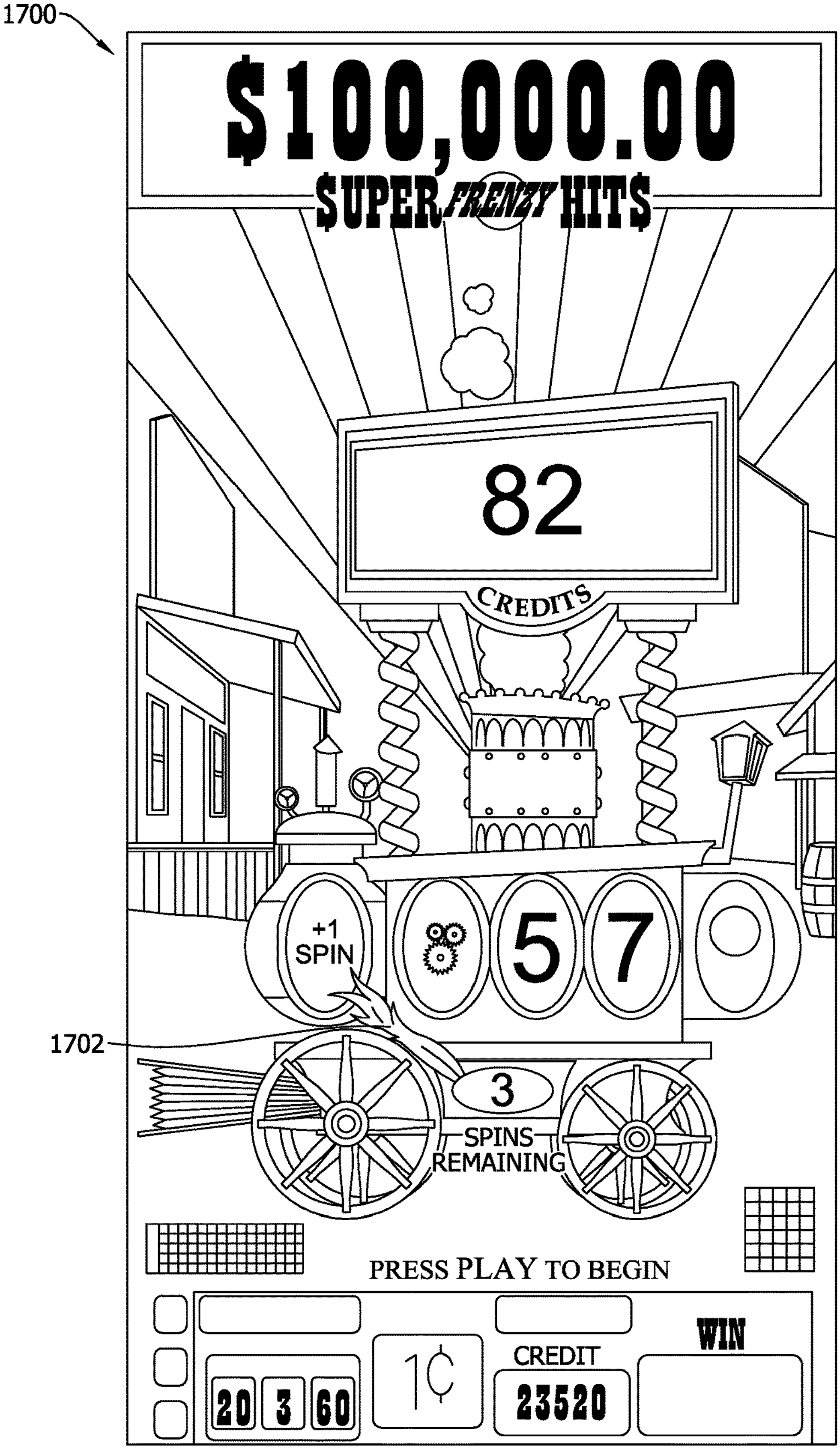
FIG. 19 illustrates another example screenshot and/or interface of the electronic game shown in FIG. 7.

FIG. 19 illustrates another example screenshot and/or interface 1700 of the electronic game shown in FIG. 7. As shown in FIG. 19, an animation 1702 is provided upon an additional spin symbol (e.g., symbol 808) appearing to communicate that an additional spin is being added for the game (e.g., animation 1702 extending between spin counter 708 and symbol position 712, where the additional spin symbol is shown).

Figure 20:
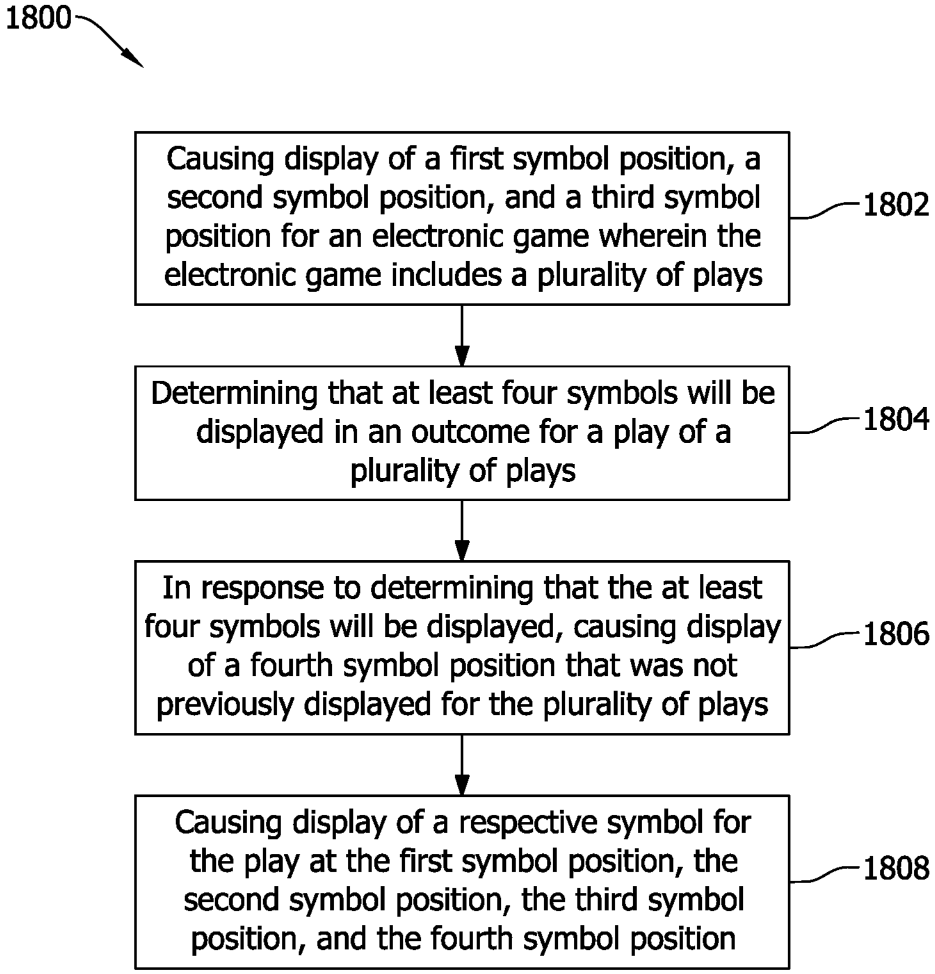
FIG. 20 illustrates an example method of electronic gaming, as described herein.

FIG. 20 illustrates an example method 1800 of electronic gaming, as described herein. As shown in FIG. 20, method 1800 includes causing display 1802 of a first symbol position (e.g., position 702), a second symbol position (e.g., position 704), and a third symbol position (e.g., position 706) for an electronic game wherein the electronic game includes a plurality of plays and determining 1804 that at least four symbols will be displayed in an outcome for a play of the plurality of plays.

Method 1800 also includes, in response to determining that the at least four symbols will be displayed, causing display 1806 of a fourth symbol position (e.g., position 712 and/or position 902) that was not previously displayed for the plurality of plays and causing display 1808 of a respective symbol for the play at the first symbol position, the second symbol position, the third symbol position, and the fourth symbol position.

In some embodiments wherein at least one of the respective symbols is a blank symbol and wherein respective symbols not being the blank symbol include respective numerical digits, method 1800 further includes concatenating the respective numerical digits of adjacent respective symbols not including the blank symbol to generate at least one concatenated number and including the concatenated number in an output amount for the electronic game.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

at least one memory device with instructions stored thereon; and at least one processor in communication with the at least one memory device, wherein the instructions, when executed by the at least one processor, cause the at least one processor to:

cause display of a first symbol position, a second symbol position, and a third symbol position for an electronic game, wherein the electronic game comprises a plurality of plays;

determine that at least four symbols will be displayed in an outcome for a play of the plurality of plays;

in response to determining that the at least four symbols will be displayed, cause display of a fourth symbol position that was not previously displayed for the plurality of plays;

cause display of a respective symbol for the play at the first symbol position, the second symbol position, the third symbol position, and the fourth symbol position, wherein the respective symbol at at least one of the second symbol position or the third symbol position is a blank symbol and other respective symbols are numerical digits including at least two side-by-side numerical digits;

concatenate the at least two side-by-side numerical digits to generate a concatenated number; and add the concatenated number to a numerical digit on an opposite side of the blank symbol from the at least two side-by-side numerical digits to generate an output amount for the play.

2. The electronic gaming device of claim 1, wherein the instructions further cause the at least one processor to:

determine that at least five symbols will be displayed in an outcome for a second play of the plurality of plays; and in response to determining that the at least five symbols will be displayed, cause display of a fifth symbol position that was not previously displayed for the plurality of plays.

3. The electronic gaming device of claim 2, wherein the instructions further cause the at least one processor to:

determine that at least three symbols will be displayed in an outcome for a prior play of the plurality of plays, the prior play occurring prior to the play of the plurality of plays and the second play of the plurality of plays; and cause display of a respective symbol for the prior play at the first symbol position, the second symbol position, and the third symbol position while not causing display of the fourth symbol position or the fifth symbol position.

4. The electronic gaming device of claim 1, wherein the instructions further cause the at least one processor to:

cause display of a plurality of display areas for a base game different from the electronic game;

randomly determine whether to add an unlock symbol to a display area of the plurality of display areas upon each non-winning outcome of the base game; and upon each display area of the plurality of display areas including the unlock symbol, cause the electronic game to be initiated, wherein the electronic game comprises a bonus game.

5. The electronic gaming device of claim 1, wherein the first symbol position, the second symbol position, the third symbol position, and the fourth symbol position are arranged in a side-by-side arrangement, and wherein the instructions further cause the at least one processor to determine that at least one of the respective symbols comprises the blank symbol.

6. The electronic gaming device of claim 5, wherein the at least two side-by-side symbols of the respective symbols are included to the left of the blank symbol, wherein the right of the blank symbol is the opposite side of the blank symbol, and wherein the instructions further cause the at least one processor to cause display of the output amount.

7. The electronic gaming device of claim 5, wherein the at least two side-by-side symbols of the respective symbols are included to the right of the blank symbol, wherein the left of the blank symbol is the opposite side of the blank symbol, and wherein the instructions further cause the at least one processor to cause display of the output amount.

8. The electronic gaming device of claim 5, wherein the instructions further cause the at least one processor to:

cause display of a fifth symbol position, wherein the numerical digit on the opposite side of the blank symbol comprises two or more side-by-side numerical digits;

concatenate the two or more numerical digits on the opposite side of the blank symbol to generate a second concatenated number; and cause display of the output amount.

9. The electronic gaming device of claim 1, wherein the instructions further cause the at least one processor to determine that no symbol will be displayed at the fourth symbol position for a next play of the plurality of plays.

10. The electronic gaming device of claim 9, wherein the instructions further cause the at least one processor to cause display of an animation that covers the fourth symbol position while the fourth symbol position remains displayed to indicate that no symbol will be provided at the fourth symbol position for the next play.

11. At least one non-transitory computer-readable storage medium with instructions stored thereon that, in response to execution by at least one processor, cause the at least one processor to:

cause display of a first symbol position, a second symbol position, and a third symbol position for an electronic game, wherein the electronic game comprises a plurality of plays;

determine that at least four symbols will be displayed in an outcome for a play of the plurality of plays;

in response to determining that the at least four symbols will be displayed, cause display of a fourth symbol position that was not previously displayed for the plurality of plays;

cause display of a respective symbol for the play at the first symbol position, the second symbol position, the third symbol position, and the fourth symbol position, wherein the respective symbol at at least one of the second symbol position or the third symbol position is a blank symbol and other respective symbols are numerical digits including at least two side-by-side numerical digits;

concatenate the at least two side-by-side numerical digits to generate a concatenated number; and add the concatenated number to a numerical digit on an opposite side of the blank symbol from the at least two side-by-side numerical digits to generate an output amount for the play.

12. The at least one non-transitory computer-readable storage medium of claim 11, wherein the instructions further cause the at least one processor to:

determine that at least five symbols will be displayed in an outcome for a second play of the plurality of plays; and in response to determining that the at least five symbols will be displayed, cause display of a fifth symbol position that was not previously displayed for the plurality of plays.

13. The at least one non-transitory computer-readable storage medium of claim 11, wherein the instructions further cause the at least one processor to:

determine that at least three symbols will be displayed in an outcome for a prior play of the plurality of plays, the prior play occurring prior to the play of the plurality of plays and the second play of the plurality of plays; and cause display of a respective symbol for the prior play at the first symbol position, the second symbol position, and the third symbol position while not causing display of the fourth symbol position or the fifth symbol position.

14. The at least one non-transitory computer-readable storage medium of claim 11, wherein the first symbol position, the second symbol position, the third symbol position, and the fourth symbol position are arranged in a side-by-side arrangement, and wherein the instructions further cause the at least one processor to determine that at least one of the respective symbols comprises the blank symbol.

15. The at least one non-transitory computer-readable storage medium of claim 14, wherein the at least two side-by-side symbols are included to the left of the blank symbol, wherein the right of the blank symbol is the opposite side of the blank symbol, and wherein the instructions further cause the at least one processor to cause display of the output amount.

16. The at least one non-transitory computer-readable storage medium of claim 14, wherein the at least two side-by-side symbols are included to the right of the blank symbol, wherein the left of the blank symbol is the opposite side of the blank symbol, and wherein the instructions further cause the at least one processor to cause display of the output amount.

17. The at least one non-transitory computer-readable storage medium of claim 14, wherein the instructions further cause the at least one processor to:

cause display of a fifth symbol position, wherein the numerical digit on the opposite side of the blank symbol comprises two or more side-by-side numerical digits;

concatenate the two or more numerical digits on the opposite side of the blank symbol to generate a second concatenated number; and cause display of the output amount.

18. The at least one non-transitory computer-readable storage medium of claim 11, wherein the instructions further cause the at least one processor to cause display of the first symbol position, the second symbol position, the third symbol position, the fourth symbol position, and the respective symbols by transmitting at least one message to an electronic gaming device where the electronic game is being displayed.

19. A method of electronic gaming implemented by at least one processor in communication with at least one memory, the method comprising:

causing display, by the at least one processor, of a first symbol position, a second symbol position, and a third symbol position for an electronic game, wherein the electronic game comprises a plurality of plays;

determining, by the at least one processor, that at least four symbols will be displayed in an outcome for a play of the plurality of plays;

in response to determining that the at least four symbols will be displayed, causing display, by the at least one processor, of a fourth symbol position that was not previously displayed for the plurality of plays;

causing display, by the at least one processor, of a respective symbol for the play at the first symbol position, the second symbol position, the third symbol position, and the fourth symbol position, wherein the respective symbol at at least one of the second symbol position or the third symbol position is a blank symbol and other respective symbols are numerical digits including at least two side-by-side numerical digits;

concatenating, by the at least one processor, the at least two side-by-side numerical digits to generate a concatenated number; and adding, by the at least one processor, the concatenated number to a numerical digit on an opposite side of the blank symbol from the at least two side-by-side numerical digits to generate an output amount for the play.

20. The method of claim 19, wherein the method further comprises:

causing display of a fifth symbol position, wherein the numerical digit on the opposite side of the blank symbol comprises two or more side-by-side numerical digits;

concatenating the two or more numerical digits on the opposite side the blank symbol to generate a second concatenated number; and causing display of the output amount.

* * * * *